United States Patent
Bao

(10) Patent No.: US 12,113,622 B2
(45) Date of Patent: Oct. 8, 2024

(54) METHOD FOR FEEDBACK CONTROL, UE, AND NETWORK DEVICE

(71) Applicant: VIVO MOBILE COMMUNICATION CO., LTD., Guangdong (CN)

(72) Inventor: Wei Bao, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 405 days.

(21) Appl. No.: 17/514,032

(22) Filed: Oct. 29, 2021

(65) Prior Publication Data

US 2022/0052793 A1 Feb. 17, 2022

Related U.S. Application Data

(63) Continuation of application No. PCT/CN2020/085712, filed on Apr. 20, 2020.

(30) Foreign Application Priority Data

Apr. 30, 2019 (CN) .......................... 201910365493.1

(51) Int. Cl.
*H04L 1/18* (2023.01)
*H04L 1/1607* (2023.01)
(Continued)

(52) U.S. Cl.
CPC .......... *H04L 1/1812* (2013.01); *H04L 1/1607* (2013.01); *H04W 72/1273* (2013.01)

(58) Field of Classification Search
CPC ... H04L 1/1812; H04L 1/1607; H04L 1/1822; H04L 1/1861; H04L 1/1896;
(Continued)

(56) References Cited

U.S. PATENT DOCUMENTS

2015/0043394 A1 2/2015 Lin et al.
2018/0019842 A1 1/2018 Fu et al.
(Continued)

FOREIGN PATENT DOCUMENTS

CN 103326806 A 9/2013
CN 106160983 A 11/2016
(Continued)

OTHER PUBLICATIONS

Huawei, "HARQ enhancements in NR unlicensed", 3GPP TSG RAN WG1 Meeting #96bis, R1-1903930, Xi'an, China, Apr. 8-12, 2019 (Year: 2019).*
(Continued)

*Primary Examiner* — Lan-Huong Truong
(74) *Attorney, Agent, or Firm* — Price Heneveld LLP

(57) ABSTRACT

Embodiments of this disclosure provide a method for feedback control, UE, and a network device. Specifically, the method for feedback control includes: receiving, by the UE, first downlink control information DCI from a network device, where the first DCI includes a first field, and the first field is used to indicate whether hybrid automatic repeat request acknowledgment HARQ-ACK information for at least one physical downlink shared channel PDSCH group is carried on a first uplink control channel for transmission. The first uplink control channel is indicated by the first DCI, the first field occupies M bits, M is a positive integer less than P, and P is a maximum number of PDSCH groups applicable to the UE. The method is specifically applied to a scenario in which the UE sends feedback information to the network device.

20 Claims, 5 Drawing Sheets

(51) Int. Cl.
*H04L 1/1812* (2023.01)
*H04W 72/1273* (2023.01)

(58) Field of Classification Search
CPC ... H04L 1/1854; H04L 5/0055; H04L 1/1671; H04L 5/0094; H04W 72/1273; H04W 72/23
See application file for complete search history.

(56) References Cited

U.S. PATENT DOCUMENTS

| | | | |
|---|---|---|---|
| 2018/0019843 A1 | 1/2018 | Papasakellariou | |
| 2018/0145796 A1 | 5/2018 | Liang et al. | |
| 2019/0349942 A1 | 11/2019 | Li et al. | |
| 2020/0177322 A1 | 6/2020 | Xu et al. | |
| 2021/0314102 A1* | 10/2021 | Li | H04L 1/1896 |
| 2023/0106098 A1* | 4/2023 | Wang | H04W 72/21 370/329 |

FOREIGN PATENT DOCUMENTS

| | | |
|---|---|---|
| CN | 106301670 A | 1/2017 |
| CN | 108271262 A | 7/2018 |
| CN | 109150436 A | 1/2019 |
| CN | 109391372 A | 2/2019 |
| CN | 109474371 A | 3/2019 |
| CN | 109478978 A | 3/2019 |
| WO | 2018137206 A1 | 8/2018 |
| WO | 2019050363 A1 | 3/2019 |

OTHER PUBLICATIONS

Intel Corporation, "Enhancements to HARQ for NR-unlicensed", 3GPP TSG RAN WG1 Meeting #96bis, R1-1904287, Xi'an, China, Apr. 8-12, 2019 (Year: 2019).*
Intel Corporation, "Enhancements to HARQ for NR-unlicensed", 3GPP TSG RAN WG1 Meeting #96bis, R1-1904287, Xi'an, China, Apr. 8-12, 2019.
VIvo, "Discussion on HARQ operation for NR-U", 3GPP TSG RAN WG1 Meeting #96bis, R1-1904067, Xi'an, China, Apr. 8-12, 2019.
Huawei, "HARQ enhancements in NR unlicensed", 3GPP TSG RAN WG1 Meeting #96bis, R1-1903930, Xi'an, China, Apr. 8-12, 2019.
Nokia, "HARQ-ACK bundling and scheduling for FeMTC", 3GPP TSG-RAN WG1 Meeting #88, R1-1701855, Athens, Greece Feb. 13-17, 2017.
Mediatek Inc., "Enhancements to HARQ for NR-U operation", 3GPP TSG RAN WG1 #96, R1-1901800, Athens, Greece, Feb. 25-Mar. 1, 2019.
Mediatek Inc., "Enhancements to HARQ for NR-U operation", 3GPP TSG RAN WG1 #96bis, R1-1904484, Xi'an, China, Apr. 8-12, 2019.

* cited by examiner

METHOD FOR FEEDBACK CONTROL, UE, AND NETWORK DEVICE

CROSS-REFERENCE TO RELATED APPLICATIONS

This application is a continuation application of International Application No. PCT/CN2020/085712 filed on Apr. 20, 2020, which claims priority to Chinese Patent Application No. 201910365493.1, filed with the Chinese Intellectual Property Office on Apr. 30, 2019 and entitled "METHOD FOR FEEDBACK CONTROL, UE, AND NETWORK DEVICE", which are incorporated herein by reference in their entireties.

TECHNICAL FIELD

Embodiments of this disclosure relate to the field of communications technologies, and in particular, to a method for feedback control, UE, and a network device.

BACKGROUND

In a wireless communications system, to ensure reliability of receiving a physical downlink shared channel (PDSCH) by user equipment (UE), the UE may send feedback information to a network device after the UE performs a reception operation on the PDSCH, so as to feed back to the network device whether the UE has successfully received the PDSCH. Specifically, the UE may use a dynamic codebook-based hybrid automatic repeat request acknowledgement (Hybrid Automatic Repeat reQuest-ACKnowledgement, HARQ-ACK) feedback mechanism to send the feedback information to the network device, that is, the UE sends feedback information for one or more PDSCH groups configured by the network device for the UE.

In the dynamic codebook-based HARQ-ACK reporting mechanism, the UE may send HARQ-ACK information for one PDSCH group to the network device. Specifically, when the network device schedules a plurality of PDSCHs, the network device may divide the plurality of scheduled PDSCHs into at least one PDSCH group. When the network device schedules each PDSCH, the network device may indicate, in downlink control information (DCI), a PDSCH group corresponding to the PDSCH, other PDSCH group(s) requiring feedback simultaneously along with the PDSCH group corresponding to the PDSCH, and feedback resources for such PDSCH groups, so that the UE can send HARQ-ACK information for the PDSCH groups to the network device by using the dynamic codebook-based HARQ-ACK reporting mechanism. Specifically, the UE may construct feedback information based on the HARQ-ACK information for each PDSCH group and send the feedback information to the network device, thereby implementing feedback of the HARQ-ACK information for each PDSCH group to the network device.

However, when the number of PDSCH groups requiring feedback simultaneously along with a specific PDSCH is larger, the feedback information sent by the UE based on the foregoing reporting mechanism occupies more bits, and consequently there is a higher probability of inconsistent understanding on the feedback information between the UE and the network device due to problems such as failures in detecting DCI and HARQ-ACK information in the network. This leads to lower reliability of receiving the feedback information by the network device, resulting in greater impact on performance of data transmission.

SUMMARY

Embodiments of this disclosure provide a method for feedback control, UE, and a network device, so as to reduce bit overheads for indicating PDSCH group(s) to UE by a network device, resolving the problem of lower reliability of receiving feedback information by the network device.

In order to resolve the foregoing technical problem, this disclosure is implemented as follows:

According to a first aspect, an embodiment of this disclosure provides a method for feedback control applied to UE. The method includes: receiving, by the UE, first downlink control information DCI from a network device, where the first DCI includes a first field, and the first field is used to indicate whether hybrid automatic repeat request acknowledgment HARQ-ACK information for at least one physical downlink shared channel PDSCH group is carried on a first uplink control channel for transmission; and the first uplink control channel is indicated by the first DCI, the first field occupies M bits, M is a positive integer less than P, and P is a maximum number of PDSCH groups applicable to the UE.

According to a second aspect, an embodiment of this disclosure provides a method for feedback control applied to a network device. The method includes: sending first downlink control information DCI to UE, where the first DCI includes a first field, and the first field is used to indicate whether hybrid automatic repeat request acknowledgment HARQ-ACK information for at least one physical downlink shared channel PDSCH group is carried on a first uplink control channel for transmission; and the first uplink control channel is indicated by the first DCI, the first field occupies M bits, M is a positive integer less than P, and P is a maximum number of PDSCH groups applicable to the UE.

According to a third aspect, an embodiment of this disclosure provides a method for feedback control applied to UE. The method includes: in a case that the UE sends feedback information for a physical downlink shared channel PDSCH group that is configured by a network device for the UE, and it is detected that a preset condition is satisfied, send a target uplink control channel to the network device, where the target uplink control channel carries at least one piece of first target feedback information, each piece of first target feedback information is hybrid automatic repeat request acknowledgment HARQ-ACK information for one hybrid automatic repeat request HARQ process, and HARQ processes for the at least one piece of first target feedback information are all HARQ processes configured by the network device for the UE.

According to a fourth aspect, an embodiment of this disclosure provides a method for feedback control applied to a network device. The method includes: receiving a target uplink control channel from user equipment UE, where the target uplink control channel carries at least one piece of first target feedback information, each piece of first target feedback information is hybrid automatic repeat request acknowledgment HARQ-ACK information for one hybrid automatic repeat request HARQ process, and HARQ processes for the at least one piece of first target feedback information are all HARQ processes configured by the network device.

According to a fifth aspect, an embodiment of this disclosure provides a method for feedback control applied to UE. The method includes: receiving first downlink control information DCI from a network device, where the first DCI includes a first field, and the first field is used to indicate whether hybrid automatic repeat request acknowledgment HARQ-ACK information for at least one physical downlink shared channel PDSCH group is carried on a first uplink control channel for transmission; the first DCI is DCI for a first UE group, and the first UE group includes the UE; and the first field occupies P bits, and P is a maximum number of PDSCH groups applicable to the UE.

According to a sixth aspect, an embodiment of this disclosure provides a method for feedback control applied to a network device. The method includes: sending first downlink control information DCI to user equipment UE, where the first DCI includes a first field, and the first field is used to indicate whether hybrid automatic repeat request acknowledgment HARQ-ACK information for at least one physical downlink shared channel PDSCH group is carried on a first uplink control channel for transmission; the first DCI is DCI for a first UE group, and the first UE group includes the UE; and the first field occupies P bits, and P is a maximum number of PDSCH groups applicable to the UE.

According to a seventh aspect, an embodiment of this disclosure provides UE, including a receiving module. The receiving module is configured to receive first downlink control information DCI from a network device, where the first DCI includes a first field, and the first field is used to indicate whether hybrid automatic repeat request acknowledgment HARQ-ACK information for at least one physical downlink shared channel PDSCH group is carried on a first uplink control channel for transmission. The first uplink control channel is indicated by the first DCI, the first field occupies M bits, M is a positive integer less than P, and P is a maximum number of PDSCH groups applicable to the UE.

According to an eighth aspect, an embodiment of this disclosure provides a transmitting module. The transmitting module is configured to send first downlink control information DCI to user equipment UE, where the first DCI includes a first field, and the first field is used to indicate whether hybrid automatic repeat request acknowledgment HARQ-ACK information for at least one physical downlink shared channel PDSCH group is carried on a first uplink control channel for transmission. The first uplink control channel is indicated by the first DCI, the first field occupies M bits, M is a positive integer less than P, and P is a maximum number of PDSCH groups applicable to the UE.

According to a ninth aspect, an embodiment of this disclosure provides UE, including a transmitting module. The transmitting module is configured to: in a case that the UE sends feedback information for a physical downlink shared channel PDSCH group that is configured by a network device for the UE, and it is detected that a preset condition is satisfied, send a target uplink control channel to the network device, where the target uplink control channel carries at least one piece of first target feedback information, each piece of first target feedback information is hybrid automatic repeat request acknowledgment HARQ-ACK information for one hybrid automatic repeat request HARQ process, and HARQ processes for the at least one piece of first target feedback information are all HARQ processes configured by the network device for the UE.

According to a tenth aspect, an embodiment of this disclosure provides a network device, including a receiving module. The receiving module is configured to: receive a target uplink control channel from user equipment UE, where the target uplink control channel carries at least one piece of first target feedback information, each piece of first target feedback information is hybrid automatic repeat request acknowledgment HARQ-ACK information for one hybrid automatic repeat request HARQ process, and HARQ processes for the at least one piece of first target feedback information are all HARQ processes configured by the network device.

According to an eleventh aspect, an embodiment of this disclosure provides UE, including a receiving module. The receiving module is configured to: receive first downlink control information DCI from a network device, where the first DCI includes a first field, and the first field is used to indicate whether hybrid automatic repeat request acknowledgment HARQ-ACK information for at least one physical downlink shared channel PDSCH group is carried on a first uplink control channel for transmission. The first DCI is DCI for a first UE group, the first UE group includes the UE, the first field occupies P bits, and P is a maximum number of PDSCH groups applicable to the UE.

According to a twelfth aspect, an embodiment of this disclosure provides a network device, including a transmitting module. The transmitting module is configured to: send first downlink control information DCI to user equipment UE, where the first DCI includes a first field, and the first field is used to indicate whether hybrid automatic repeat request acknowledgment HARQ-ACK information for at least one physical downlink shared channel PDSCH group is carried on a first uplink control channel for transmission; the first DCI is DCI for a first UE group, and the first UE group includes the UE; and the first field occupies P bits, and P is a maximum number of PDSCH groups applicable to the UE.

According to a thirteenth aspect, an embodiment of this disclosure provides UE, including a processor, a memory, and a computer program stored in the memory and capable of running on the processor. When the computer program is executed by the processor, the steps of the method for feedback control according to the first aspect or the third aspect or the fifth aspect are implemented.

According to a fourteenth aspect, an embodiment of this disclosure provides a network device, including a processor, a memory, and a computer program stored in the memory and capable of running on the processor. When the computer program is executed by the processor, the steps of the method for feedback control according to the second aspect or the fourth aspect or the sixth aspect are implemented.

According to a fifteenth aspect, an embodiment of this disclosure provides a computer-readable storage medium, where the computer-readable storage medium stores a computer program, and when the computer program is executed by a processor, the steps of the foregoing method for feedback control are implemented.

In the embodiments of this disclosure, in a scenario in which the network device schedules a PDSCH for the UE by using DCI, for the first PDSCH group to which the PDSCH currently scheduled in the DCI belongs, the UE usually needs to have HARQ-ACK information corresponding to the first PDSCH group carried on a PUCCH indicated by the DCI, for transmission. In this way, a bit corresponding to the first PDSCH group does not need to be set in the first field of the DCI by the network device, where the bit is used to specially indicate whether the UE needs to have the HARQ-ACK information corresponding to the first PDSCH group carried on the PUCCH indicated by the DCI, for transmission. Specifically, for other PDSCH groups than the first PDSCH group in the available PDSCH groups (whose quantity is P) for the UE, all bits in the first field are set to be in one-to-one correspondence to all of the other PDSCH groups, so that the UE can learn about all PDSCH groups for which HARQ-ACK information needs to be carried on the PUCCH indicated by the DCI, for transmission. Therefore, the number M of bits occupied by the first field may be less than P, that is, M is less than the number of PDSCH groups applicable to the UE. This reduces the number of bits of the field, in the DCI, for indicating a PDSCH group for which HARQ-ACK information needs to be sent, that is, reduces bit overheads. This helps reduce the number of bits of the DCI, and therefore, in a case of the same DCI detection success rate, radio resources that need to be occupied by DCI transmission are reduced, or in a case of the same radio resources, a DCI detection success rate is improved.

DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure shall fall within the protection scope of this disclosure.

The technical solutions provided in this disclosure may be applied to various communications systems, such as a 5G communications system, a future evolved system, or a plurality of communication fusion systems. Examples of various application scenarios may include scenarios such as machine-to-machine (M2M), D2M, macro-micro communication, enhanced mobile Internet (eMBB), ultra-reliable low-latency communications (uRLLC), and mass machine type communication (mMTC). These scenarios include, but are not limited to, scenarios such as communication between terminal devices, communication between network devices, or communication between a network device and a terminal device. The embodiments of this disclosure can be applied to communication between a network device and a terminal device, or communication between terminal devices, or communication between network devices in a 5G communications system.

For example, a method for feedback control provided by the embodiments of this disclosure may be applied to a 5G NR communications system, such as a 5G NR communications system working on unlicensed spectrums (5G NR-U). In the embodiments of this disclosure, a 5G system is used as an example for description. However, those skilled in the art can understand that the systems do not constitute any limitation on the protection scope of this disclosure, and the embodiments of this disclosure may be used for subsequent evolved or other communications systems.

Figure 1:
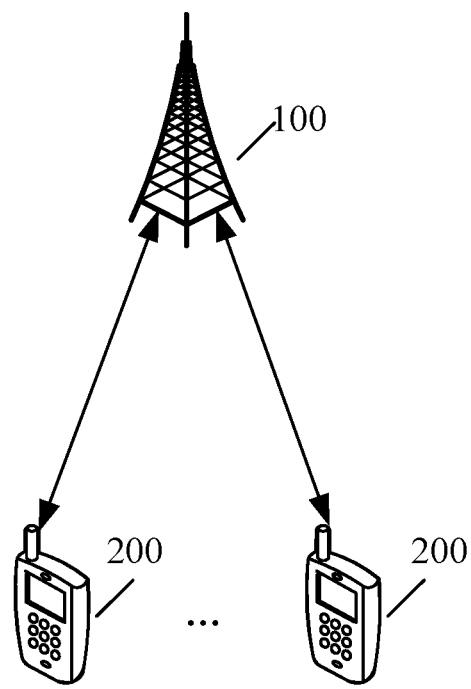
FIG. 1 is a possible schematic structural diagram of a communications system according to an embodiment of this disclosure.

FIG. 1 is a possible schematic structural diagram of a communications system included in the embodiments of this disclosure. As shown in FIG. 1, the communications system includes at least one network device 100 (only one is shown in FIG. 1) and one or more UEs 200 to which each network device 100 is connected.

The network device 100 may be a base station, a core network device, a transmission and reception point (TRP), a relay station, an access point, or the like. The network device 100 may be a base transceiver station (BTS) in a Global System for Mobile Communications (GSM) or Code Division Multiple Access (CDMA) network, may be an NB (NodeB) in Wideband Code Division Multiple Access (WCDMA), or may be an eNB or eNodeB (evolved NodeB) in LTE. The network device 100 may alternatively be a radio controller in a cloud radio access network (CRAN) scenario. The network device 100 may alternatively be a network device (such as a gNB) in a 5G communications system or a network device in a future evolved network. However, the terms used do not constitute any limitation on this disclosure. For example, the network device 100 may also be a wireless access point (Wi-Fi AP), or the like.

The UE 200 may be a wireless terminal device or may be a wired terminal device. The wireless terminal device may be a device that provides voice and/or other service data connectivity to a user, a handheld device having a wireless communication function, a computing device or other processing devices connected to a wireless modem, an in-vehicle device, a wearable device, a terminal device in a future 5G network, or a terminal device in a future evolved PLMN network, or the like. The wireless terminal device may communicate with one or more core networks via a radio access network (RAN). The wireless terminal device may be a mobile terminal device such as a mobile phone (or referred to as "cellular" phone) and a computer having a mobile terminal device, such as a portable, pocket-sized, handheld, computer built-in, or in-vehicle mobile apparatus, which exchanges voice and/or data with the radio access network; or may be a device such as a personal communication service (PCS) phone, a cordless phone, a session initiation protocol (SIP) phone, a wireless local loop (WLL) station, or a personal digital assistant (PDA). The wireless terminal device may also be a mobile device, a UE terminal device, an access terminal device, a wireless communication device, a terminal device unit, a terminal device station, a mobile station, a mobile, a remote station, a remote site, a remote terminal device, a subscriber unit, a subscriber station, a user agent, a terminal device apparatus, or the like. As an example, in this embodiment of this disclosure, FIG. 1 uses an example that the UE is a mobile phone.

For ease of understanding, the following describes some of the terms included in the embodiments of this disclosure.
1. Unlicensed Communications System In future communications systems, unlicensed bands may serve as a supplement to licensed bands to facilitate capacity expansion for operators. Unlicensed bands are shared by a plurality of radio access technologies (RAT), such as wireless fidelity (Wi-Fi), radar, and long term evolution license assisted access (LTE-LAA). Therefore, in some countries or regions, unlicensed bands need to be used in compliance with regulations, so as to ensure that all devices can use such resources fairly. For example, detection such as listen before talk (LBT) and maximum channel occupancy time (MCOT) may be performed on a radio transmission channel. Specifically, when a transmission node (such as UE) needs to send information, LBT needs to be performed on a specific radio channel, and energy detection (ED) needs to be performed on surrounding wireless transmission environments. When a detected power is less than a threshold, the radio channel is considered to be idle, and in this case, the transmission node can perform transmission on the radio channel; otherwise, the radio channel is considered to be busy, and the transmission node cannot send data on the radio channel. The transmission node may be a base station, UE, a Wi-Fi AP, or the like. After the transmission node starts transmission, a channel occupancy time cannot exceed the MCOT. For example, the 5G NR-U communications system is an unlicensed communications system.

2. Downlink Scheduling and Feedback

In a wireless communications system based on a shared channel, a network device may allocate a specified shared resource to each UE, and indicate UE by using downlink control information (DCI) to use the specified shared resource for corresponding sending/receiving operation. In a downlink direction, a resource allocation procedure for the UE by the network device is a downlink scheduling procedure. Specifically, after the UE completes a reception operation of receiving specific data from the network device, the UE needs to feed back a data reception result to the network side as feedback information, so that the network device can perform subsequent downlink scheduling processing. When the UE sends feedback information to the network device based on the HARQ reporting mechanism, the feedback here may be referred to as HARQ-ACK.

For example, in the NR communications system, a gNB (namely a network device) indicates, to UE by using DCI, information such as time-frequency resources corresponding to downlink transmission (such as a physical downlink shared channel (PDSCH)) and data transmission, and may also indicate information about a physical uplink control channel (PUCCH) resource used for transmission of corresponding HARQ-ACK information. For example, the information about the PUCCH resource includes a PUCCH resource index PRI, and an offset between a slot in which the PUCCH resource is located and a slot in which the PDSCH transmission is located. In a case of a PUCCH resource slot offset, the network device may first semi-statically configure a slot offset table dl-DataToUL-ACK for the UE by using a radio resource control (RRC) message. The offset table is a sequence of available slot offsets. Then, the network device uses the PDSCH-to-HARQ-timing-indicator field in the DCI to indicate a specific index in the semi-statically configured sequence as a PUCCH resource slot offset that actually takes effect.

3. HARQ-ACK Codebook

In the NR communications system, when the UE organizes the HARQ-ACK bit sequence that needs to be reported at a feedback occasion, a correspondence between each downlink PDSCH transmission and a bit in the organized information (namely, the HARQ-ACK bit sequence) may be determined based on a predefined rule and scheduling statuses of uplink and downlink PDSCH transmissions that are on one or more carriers and that require reporting of HARQ-ACK information at this feedback occasion. The foregoing operation is referred to as constructing a HARQ-ACK codebook or referred o as a HARQ-ACK codebook scheme. Specifically, the HARQ-ACK information may represent acknowledgement (ACK) information or negative-acknowledgment (NACK) information.

For example, in NR release 15, two HARQ-ACK codebook schemes are used: semi-static codebook (Type-1) and dynamic codebook (Type-2).

In the semi-static codebook-based HARQ-ACK reporting mechanism, a corresponding feedback bit is reserved in the semi-static codebook for each possible PDSCH time domain allocation at each possible scheduling occasion based on a feedback timing configuration table (which is the foregoing slot offset table dl-DataToUL-ACK) and a HARQ-ACK feedback occasion. Based on a configuration in the feedback timing configuration table, a HARQ-ACK feedback occasion corresponding to the PDSCH time domain allocation is exactly an occasion of reporting a HARQ-ACK bit sequence. Specifically, if the UE does not actually detect a corresponding downlink scheduling indication for a possible PDSCH time domain allocation, a feedback bit (such as HARQ-ACK) corresponding to the PDSCH time domain allocation is set to NACK; otherwise, the feedback bit corresponding to the PDSCH time domain allocation is set based on a decoding result for corresponding PDSCH transmission corresponding to the PDSCH time domain allocation.

In the dynamic codebook-based HARQ-ACK reporting mechanism, a feedback bit may be reserved for each actually used DAI in a manner of counting downlink assignment indexes (DAI) for scheduled PDSCH transmission(s) and/or indicated semi-persistent scheduling (Semi-Persistent Scheduling, SPS) PDSCH release(s). Specifically, if the UE deduces, based on other detected DAIS, that PDSCH assignment indications or SPS PDSCH release indications corresponding to some DAIS have not been received, the corresponding feedback bit (such as HARQ-ACK) is set to NACK; otherwise, the UE may set the corresponding feedback bit based on the decoding result of the PDSCH transmission corresponding to each PDSCH allocation indication; or set a corresponding feedback bit for the detected SPS PDSCH release indication to be ACK.

Based on the one-shot HARQ-ACK feedback (one-shot HARQ-ACK feedback) mechanism, the network device may preconfigure a plurality of available HARQ processes for the UE. Specifically, for each of all HARQ processes configured by the network device for the UE, the UE may have the HARQ-ACK information corresponding to one HARQ process carried on the uplink control channel indicated by the current DCI for transmission.

4. DAI

The PDCCH transmission is not completely reliable, and some downlink DCI may be lost for the UE, resulting in a higher HARQ error rate. For example, for time division duplexing (TDD), when some downlink DCI in a HARQ feedback window are lost, ACKs may be incorrectly fed back. To avoid such problem, in the dynamic codebook-based HARQ-ACK reporting mechanism, a DAI field may be included in the DCI carried by the PDCCH, and is used to indicate to the UE an index, of a PDSCH transmission scheduled by a specific piece of DCI, in the HARQ-ACK feedback bit sequence. In addition, the DAI may help the UE to detect whether the downlink DCI is lost. The DAI may also help the UE determine ACK/NACK information of how many bits needs to be fed back.

Specifically, the DAI is indicated by using a limited number of bits (currently, a single DAI generally occupies 2 bits). In order to expand its indication range, a modulo operation is introduced, that is, to start counting sequentially from 1, and then take the modulo to obtain a DAI value corresponding to a count value. For processing of the DAI in downlink scheduling, refer to the following Table 1.

TABLE 1

| DDAI MSB, LSB | $V_{C\text{-}DAI}^{DL}$ or $V_{T\text{-}DAI}^{DL}$ | Quantity of {serving cell, PDCCH listening timing} pairs with PDSCH transmission indicated by PDCCH or with PDCCH indicating SPS PDSCH release, where the quantity is denoted by Y, and Y ≥ 1 |
|---|---|---|
| 0, 0 | 1 | (Y − 1)mod 4 + 1 = 1 |
| 0, 1 | 2 | (Y − 1)mod 4 + 1 = 2 |
| 1, 0 | 3 | (Y − 1)mod 4 + 1 = 3 |
| 1, 1 | 4 | (Y − 1)mod 4 + 1 = 4 |

In Table 1, $V_{C\text{-}DAI}^{DL}$ is used to indicate a counter DAI value (which is a form of DAI that is used for counting indexes and can be gradually accumulated based on downlink PDSCH scheduling statuses) carried in DCI for downlink scheduling, and $V_{T\text{-}DAI}^{DL}$ is used to indicate a total DAI value (which is a form of DAI, used to indicate a DAI value corresponding to the last PDSCH in the current PDCCH monitoring opportunity in continuous PDSCH scheduling, and only used in a multi-carrier CA scenario) carried in DCI for downlink scheduling. (Y−1) mod 4+1 is used to obtain a value that can be indicated in the DCI actually, by modulo operation towards 4.

5. HARQ-ACK Reporting Mechanism in the NR-U COMMUNICATIONS System

For the NR-U communications system, during feedback of the HARQ-ACK corresponding to the downlink PDSCH transmission based on the downlink scheduling signaling by the UE, the UE fails to feed back the HARQ-ACK as expected due to the following reasons: because downlink scheduling is performed at the tail of (COT) requested by the gNB and PUCCH resources within the COT cannot be indicated, because of uncertainty in obtaining a radio channel before the UE transmits the PUCCH according to an indication, because of interference caused by potential hidden nodes during PUCCH transmission, and so on. In other words, the HARQ-ACK reporting mechanism in the NR-U communications system is used in a poor network environment, and a probability of HARQ-ACK feedback failure is relatively high. In this way, in order to reduce relatively large impact of the poor network environment on implementation of the HARQ-ACK reporting mechanism, the current HARQ-ACK reporting mechanism needs to be optimized to improve the probability of successful implementation of the HARQ-ACK reporting mechanism, further improving a probability of successfully sending feedback information to the network device based on the HARQ-ACK reporting mechanism.

6. Related Terms

It should be noted that, "I" in this specification represents or, for example, AB may represent A or B; and that the term "and/or" in this specification describes only an association relationship for describing associated objects and represents that three relationships may exist, for example, A and/or B may represent the following three cases: only A, both A and B, and only B.

For ease of clear description of the technical solutions of the embodiments of this disclosure, in the embodiments of this disclosure, the words "first," "second", and the like are used to distinguish the same items or similar items having substantially the same functions or roles, and those skilled in the art can understand that the words "first," "second", and the like do not constitute any limitation on a quantity and an execution order.

It should be noted that, in the embodiments of this disclosure, words such as "an example" or "for example" are used to represent an example, an instance, or an illustration. Any embodiment or design solution described as "an example" or "for example" in the embodiments of this disclosure should not be construed as being more preferred or advantageous than other embodiments or design solutions. To be precise, the words such as "an example" or "for example" are intended to present a related concept in a specific manner.

It should be noted that in the embodiments of this application, "of", "corresponding (English: corresponding, relevant)", and "corresponding" may be sometimes used interchangeably. It should be noted that the expressed meanings are the same when a difference is not emphasized. The meaning of "plurality of" in the embodiments of this application refers to two or more.

Specifically, the method for feedback control provided by the embodiments of this disclosure can be applied to the HARQ-ACK reporting mechanism, and can be used in the process of feeding back a data transmission result, such as a process of downlink scheduling and feedback. Scenarios to which the embodiments of this disclosure are specifically applicable are not limited.

For example, in the dynamic codebook-based HARQ-ACK reporting mechanism, the network device (such as a gNB) may use one piece of specific DCI to schedule PDSCH transmission, to indicate a PDSCH group (which is denoted by PDSCH group A) to which a PDSCH belongs, and to indicate PUCCH resources for carrying HARQ-ACK information corresponding to the PDSCH group. Specifically, the DCI may also include a "group index" field and a "triggered group(s)" field. The "group index" field is used to indicate the PDSCH group A to the UE, and the "triggered group(s)" field is used to indicate, to the UE, zero or a plurality of PDSCH groups requiring feedback of HARQ-ACK information on the currently indicated PUCCH resource. The PDSCH group A may be included in the plurality of PDSCH groups.

The maximum number of PDSCH groups supported by the network device for the UE may be recorded as Max_Group_Num, that is, the number of PDSCH groups supported by the network device for the UE may be Max_Group_Num PDSCH groups. The number of bits occupied by the "triggered group(s)" field in the DCI may be set to Max_Group_Num, and the "triggered group(s)" field includes Max_Group_Num bits. Different bits in the Max_Group_Num bits correspond to different PDSCH groups in the Max_Group_Num PDSCH groups, and one bit is used to indicate whether feedback information corresponding to one PDSCH group is carried on the PUCCH resource for transmission. Specifically, each PDSCH group is indicated by one group index, and each bit is indicated by one position index.

For example, if both the group index and the position index are numbered from 0, a PDSCH group with a group index of i corresponds to a bit with a position index of i, and a value of i is an integer from 0 to Max_Group_Num-1. Specifically, each bit may use 0 or 1 to indicate whether corresponding HARQ-ACK information for a corresponding PDSCH group needs to be fed back on a PUCCH resource indicated by the current DCI. For example, a value of the bit with the position index of i is 1, indicating that the HARQ-ACK information corresponding to the PDSCH group with the group index of i needs to be carried on the PUCCH resource, indicated by the current DCI, for transmission; or a value of the bit with the position index of i is 0, indicating that the HARQ-ACK information corresponding to the PDSCH group with the group index of i does not need to be carried on the PUCCH resource, indicated by the current DCI, for transmission.

It can be understood that, in the dynamic codebook-based HARQ-ACK reporting mechanism, a larger value of the maximum number of PDSCH groups supported by the network device for the UE, that is, a larger value of Max_Group_Num, indicates a larger quantity of bits occupied by the "triggered group(s)" field. In this way, a larger quantity of bits of the DCI indicated to the UE by the network device indicates more radio resources that need to be occupied by DCI transmission in a case of the same DCI detection success rate, or indicates a lower DCI detection success rate in a case of the same radio resources.

Optionally, the method for feedback control provided by the embodiments of this disclosure may be applied to a scenario in which the dynamic codebook-based HARQ-ACK reporting mechanism is combined with the one-shot HARQ-ACK reporting mechanism, or may be applied to a scenario in which the network device uses group signaling DCI to trigger a group of UEs to send HARQ-ACK information corresponding to PDSCH groups to the network device.

In view of the foregoing problem, the embodiments of this disclosure provide a method for feedback control, UE, and a network device. In a scenario in which the network device schedules a PDSCH for the UE by using DCI, the network device may use a first field in the DCI to indicate to the UE whether HARQ-ACK information corresponding to each PDSCH group triggered by the DCI needs to be carried on the current PUCCH for transmission. Specifically, the number of bits occupied by the first field can be reduced, thereby reducing bit overheads. This helps reduce the number of bits of the DCI, and therefore, in a case of the same DCI detection success rate, radio resources that need to be occupied by DCI transmission are reduced, or in a case of the same radio resources, a DCI detection success rate is improved.

Embodiment 1

Figure 2:
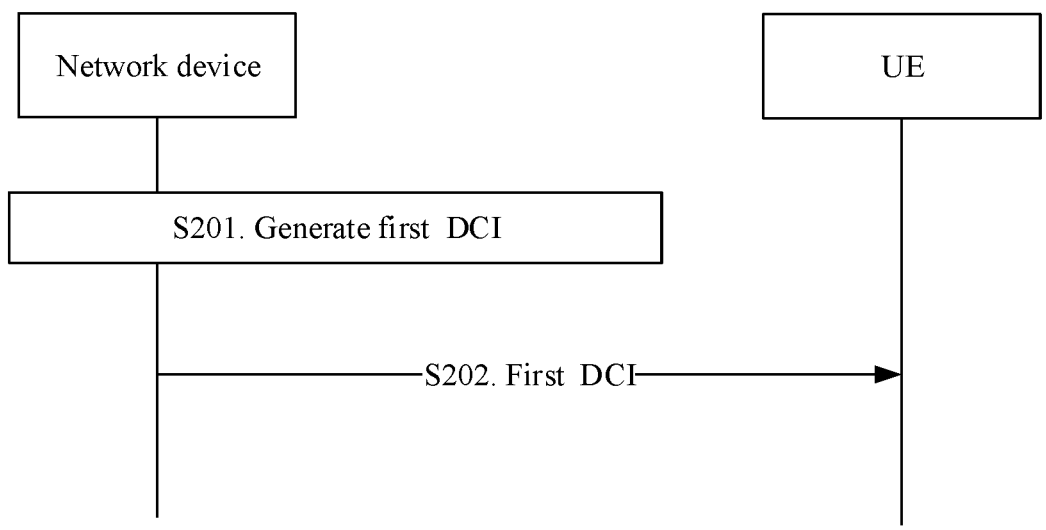
FIG. 2 is a first schematic flowchart of a method for feedback control according to an embodiment of this disclosure.

FIG. 2 shows a schematic flowchart of a method for feedback control according to an embodiment of this disclosure. As shown in FIG. 2, the method for feedback control may include step b 201 and step 202.

Step 201: A network device generates first DCI.

Specifically, after generating the first DCI, the network device may send the first DCI to UE.

Step 202: The UE receives the first DCI from the network device.

Specifically, after the network device generates the first DCI, the UE may receive the first DCI.

The first DCI includes a first field, and the first field is used to indicate whether HARQ-ACK information for at least one PDSCH group is carried on a first uplink control channel for transmission, and the first uplink control channel is indicated by the first DCI. The first field occupies M bits, M is a positive integer less than P, and P is a maximum number of PDSCH groups applicable to the UE.

It should be noted that the at least one PDSCH group may be a PDSCH group triggered by the first DCI.

Specifically, when generating the first DCI, the network device may construct the first field to obtain the first DCI.

For example, in this embodiment of this disclosure, a maximum number of PDSCH groups applicable to the UE, that is, a value of P, may be Max_Group_Num.

Optionally, the maximum number of PDSCH groups applicable to the UE, namely P, may be configured by the network device for the UE, for example, may be a parameter that is configured for the UE by using radio resource control (RRC) signaling. Alternatively, P may be a specific value defined in a communications protocol between the UE and the network device.

One PDSCH group may include one or more PDSCH transmissions. Specifically, when the network device schedules a plurality of PDSCHs, the network device may divide the plurality of scheduled PDSCHs into at least one PDSCH group. Furthermore, the network device may indicate the at least one PDSCH group to the UE, for example, indicating the at least one PDSCH group by using DCI (such as the first DCI).

It should be noted that that "the first uplink control channel is indicated by the first DCI" means that the first uplink control channel is carried on uplink resources indicated by the first DCI for transmission.

Optionally, the first DCI may be downlink scheduling DCI.

In a case that M is less than P, P minus M is equal to W, and W is an integer greater than or equal to 1. For example, W is equal to 1 or 2.

Optionally, M is equal to P minus 1. That is, the first field is one bit less than "triggered group(s)" field described above.

Optionally, in this embodiment of this disclosure, the first DCI is further used to indicate a first PDSCH group, the first PDSCH group is indicated by one first index, each of the at least one PDSCH group is indicated by one second index, and each second index corresponds to one of the M bits.

It should be emphasized that the first PDSCH group may be a PDSCH group to which a PDSCH scheduled by the first DCI belongs, and the HARQ-ACK information corresponding to the first PDSCH group needs to be carried on the PUCCH resource scheduled by the first DCI, for transmission. In other words, the HARQ-ACK information corresponding to the first PDSCH group needs to be carried on the uplink resource that carries the first uplink control channel, for transmission.

In this case, a bit for indicating whether the HARQ-ACK information corresponding to the first PDSCH group needs to be carried on the first uplink control channel for transmission does not need to be reserved in the first field included in the first DCI. Therefore, when the number of bits in the first field is less than the number of bits in the field for the "triggered group(s)" by 1, the UE can learn, based on the first field, that HARQ-ACK information corresponding to which PDSCH groups needs to be carried on the first uplink control channel for transmission.

In addition, the HARQ-ACK information corresponding to each of the at least one PDSCH group may be carried on the uplink resource, of transmitting the first uplink control channel, for transmission.

For each second index, in a case that one second index is less than the first index, a position index of a bit corresponding to the one second index is the same as the one second index; or in a case that one second index is greater than the first index, a position index of a bit corresponding to the one second index equals the one second index minus 1.

In addition, in a case that one second index is equal to the first index, the first field does not include a bit corresponding to a first resource.

For example, assuming that a value of P is 4, all PDSCH groups triggered by the network device for the UE in the first DCI include four PDSCH groups with group indexes of 0, 1, 2, and 3 in sequence, and the first field includes three bits with position indexes of 0, 1, and 2 in sequence. In a case that the first PDSCH group is a PDSCH group with a group index (which is a first index) of 1, a PDSCH group with a group index (which is a second index) of 0 corresponds to a bit with a position index of 0 in the first field; a PDSCH group with a group index of 2 corresponds to a bit with a position index of 1 in the first field; and a PDSCH group with a group index of 3 corresponds to a bit with a position index of 2 in the first field. The first field has no bit corresponding to the PDSCH group with the group index of 1. Specifically, the number of bits occupied by the first field is 3, that is, M is equal to 3.

Optionally, the first DCI further includes a second field, the second field is used to indicate the first PDSCH group, and the second field occupies T bits; and T is determined based on P.

For example, the first PDSCH group may be a PDSCH group indicated by the "group index" field.

For example, a value of the second field may be the group index of the first PDSCH group, that is, the first index. For example, with reference to the example in which P is equal to 4 and M is equal to 3, the value of the second field may be 1.

The UE may query the second field in the first DCI to determine the group index of the current first PDSCH group, that is, the first index.

Optionally, T is obtained by rounding up a floating point number of K, and K is obtained by logarithm base 2 of P.

For example, T=ceiling(K), and K=log 2(P). That is, T=ceiling(log 2(P)). "log 2( )" indicates the logarithm base 2 of P, and "ceiling( )" indicates rounding up the floating point number.

For example, in the example of P being equal to 4, T=ceiling(log 2(4))=2. That is, the second field occupies two bits.

Figure 3:
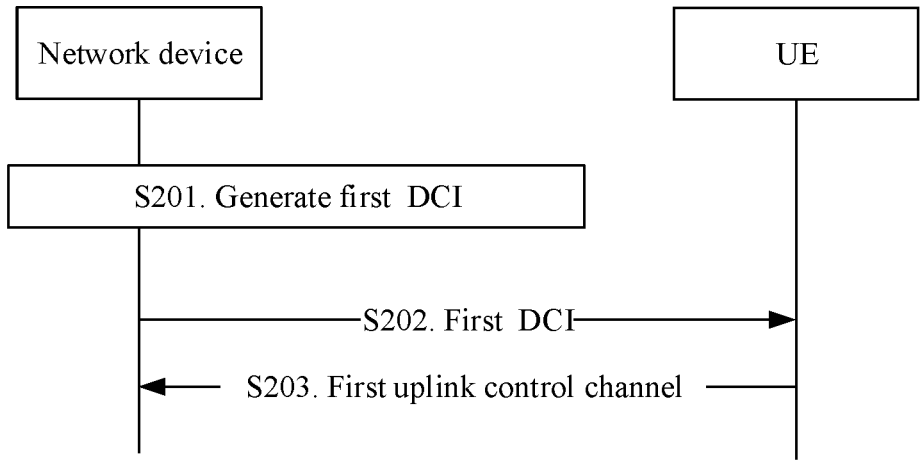
FIG. 3 is a second schematic flowchart of a method for feedback control according to an embodiment of this disclosure.

Optionally, as shown in FIG. 3, the method for feedback control provided by this embodiment of this disclosure may further include step 203 after step 202.

Step 203: The UE sends the first uplink control channel to the network device.

Correspondingly, the network device may receive the first uplink control channel from the UE.

At least one piece of first feedback information is carried on the first uplink control channel, and each piece of first feedback information is HARQ-ACK information for one PDSCH group.

Each piece of first feedback information is HARQ-ACK information for one PDSCH group, that is, each piece of first feedback information may be ACK information or NACK information.

It should be noted that the "HARQ-ACK information of one PDSCH group" is used to generally indicate HARQ-ACK information of any PDSCH group, which is not limited in this disclosure.

Optionally, the at least one piece of first feedback information carried on the first uplink control channel may be obtained by the UE by constructing the HARQ-ACK information for all the PDSCH groups into one codebook according to a specific rule.

For example, the at least one piece of first feedback information may be obtained by the UE by constructing HARQ-ACK information of PDSCH groups into one codebook according to a rule of a dynamic codebook.

Optionally, the method for feedback control provided by this embodiment of this disclosure may further include step 204 after step 203.

Step 204: In a case that it is detected that a preset condition is satisfied, the UE sends a second uplink control channel to the network device.

Correspondingly, the network device may receive the second downlink control channel from the UE.

The second uplink control channel carries at least one piece of second feedback information, each piece of second feedback information is HARQ-ACK information for one HARQ process, and HARQ process(es) corresponding to the at least one piece of second feedback information are all HARQ processes configured by the network device.

Optionally, the at least one piece of second feedback information carried on the second uplink control channel may be obtained by the UE by constructing HARQ-ACK information for all PDSCH processes into one codebook according to a specific rule.

Optionally, the second uplink control channel is the same as the first uplink control channel.

Optionally, the second uplink control channel is different from the first uplink control channel. After receiving the first DCI from the network device, the UE may further receive another piece of DCI indicating the second uplink control channel.

Specifically, in this embodiment of this disclosure, for detailed descriptions of the second uplink control channel, reference may be made to the related description of the first uplink control channel in the foregoing Embodiment 1. Details are not repeated herein.

Optionally, the preset condition is at least one of the following conditions 1 to 4:

Condition 1: The number of PDSCH groups that is indicated by the DCI received by the UE is greater than or equal to a first threshold.

Optionally, the first threshold may be defined by a communications protocol between the network device and the UE. Alternatively, the first threshold may be configured by the network device for the UE, for example, being configured by the network device for the UE by using RRC signaling.

It can be understood that inconsistent understanding between the UE and the network device on a size of the codebook and specific PDSCH transmission corresponding to bits in the codebook may be easily resulted in a case that the network device triggers a large number of PDSCH groups for the UE. For example, in a case that DCI fails to be detected, inconsistent understanding between the UE and the network device on a size of the codebook and specific PDSCH transmission corresponding to bits in the codebook may be easily resulted.

For example, when the DCI currently received by the UE is the first DCI, the UE may obtain the first PDSCH group indicated in the first DCI and the number of at least one PDSCH groups, and compare whether the quantity is greater than or equal to the first threshold. In this way, the UE can detect whether condition 1 is satisfied.

Optionally, in a case that the UE detects whether condition 1 is satisfied, the current DCI may be another piece of DCI that is sent by the network device after the first DCI is sent to the UE.

Condition 2: The number of PDSCH groups that is indicated by the DCI received by the UE is P.

When the number of PDSCH groups indicated in the DCI is P, it indicates that the network device triggers a relatively large number of PDSCH groups for the UE.

For example, when the DCI currently received by the UE is the first DCI, the UE may obtain the first PDSCH group indicated in the first DCI and the number of at least one PDSCH groups, and compare whether the quantity is equal to P (for example, P is equal to 4). In this way, the UE can detect whether condition 2 is satisfied.

Similarly, in this embodiment of this disclosure, for related descriptions of condition 2, reference may be made to the foregoing related description of condition 1. Details are not repeated herein.

Condition 3: The number of bits of fourth feedback information is greater than or equal to a second threshold; and the fourth feedback information is HARQ-ACK information of all PDSCH groups that are indicated in the DCI received by the UE.

Optionally, the second threshold may be defined by a communications protocol between the network device and the UE. Alternatively, the second threshold may be configured by the network device for the UE, for example, being configured by the network device for the UE by using RRC signaling.

For example, the second threshold may indicate the number of all HARQ processes configured by the network device for the UE, or the second threshold indicates a ratio of the number of bits of the fourth feedback information to the number of all HARQ processes configured by the network device for the UE.

To be specific, that "the number of bits of the fourth feedback information is greater than or equal to the second threshold" means that the number of bits (which is the number of occupied bits) of HARQ-ACK information that is corresponding to each PDSCH group and triggered by the UE for the network device is equal to or exceeds the number of all HARQ processes configured, or equal to or exceeds a specific percentage of the quantity.

It can be understood that when HARQ-ACK information sent by the UE and corresponding to a PDSCH group triggered by the network device has a relatively large number of bits, inconsistent understanding between the UE and the network device on a size of the codebook (which is the number of bits occupied by the codebook) and specific PDSCH transmission corresponding to bits in the codebook may be easily resulted (there is a higher probability for such problem when the number of PDSCH groups exceeds one). In comparison, HARQ-ACK information that is sent by the UE and corresponding to a HARQ process triggered by the network device has a relatively small number of bits, thereby reducing bits occupied by a codebook that the UE subsequently feeds back to the network device.

Condition 4: The UE receives target indication information, and the target indication information is used to indicate that the UE sends HARQ-ACK information for all HARQ processes that are triggered by the network device.

Correspondingly, the network device may send the target indication information to the UE.

Similarly, in this embodiment of this disclosure, for the description of the case in which the preset condition is more than one conditions in the condition 1 to condition 4, reference may be made to the related description of any one of the foregoing condition 1 to condition 4. Details are not repeated herein.

Optionally, the target indication information is sent to the UE by the network device through common signaling.

For example, the common signaling may be DCI that does not carry applicable scheduling information, such as DCI indicating downlink scheduling information with empty time-frequency resource allocation, or uplink scheduling DCI.

Optionally, the target indication information is indicated by one bit in the common signaling.

For example, the target indication information is a target bit indication in the common signaling. For example, if a value of the target bit is 1, the UE is indicated to send HARQ-ACK information for all HARQ processes configured by the network device for the UE; on the contrary, if the value of the target bit is 1, the UE is indicated to send HARQ-ACK information for all PDSCH groups configured by the network device for the UE.

Optionally, the common signaling further includes assistance information; the assistance information is used to indicate a data transmission state of each of all the HARQ processes that are configured by the network device; and the data transmission state is a scheduled state or an unscheduled state.

For example, the assistance information may be new data indicator (NDI) information. For example, the NDI information may occupy one bit. When a value of the bit is 1, a data transmission state indicated by the bit is a scheduled state, and when a value of the bit is 0, a data transmission state indicated by the bit is an unscheduled state.

According to the method for feedback control provided in this embodiment of this disclosure, in a scenario in which the network device schedules a PDSCH for the UE by using DCI, for the first PDSCH group to which the PDSCH currently scheduled in the DCI belongs, the UE usually needs to have HARQ-ACK information corresponding to the first PDSCH group carried on a PUCCH indicated by the DCI, for transmission. In this way, a bit corresponding to the first PDSCH group does not need to be set in the first field of the DCI by the network device, where the bit is used to specially indicate whether the UE needs to have the HARQ-ACK information corresponding to the first PDSCH group carried on the PUCCH indicated by the DCI, for transmission. Specifically, for other PDSCH groups than the first PDSCH group in the available PDSCH groups (whose quantity is P) for the UE, all bits in the first field are set to be in one-to-one correspondence to all of the other PDSCH groups, so that the UE can learn about all PDSCH groups for which HARQ-ACK information needs to be carried on the PUCCH indicated by the DCI, for transmission. Therefore, the number M of bits occupied by the first field may be less than P, that is, M is less than the number of PDSCH groups applicable to the UE. This reduces the number of bits of the field, in the DCI, used for indicating a PDSCH group for which HARQ-ACK information needs to be sent, that is, reduces bit overheads. This helps reduce the number of bits of the DCI, and therefore, in a case of the same DCI detection success rate, radio resources that need to be occupied by DCI transmission are reduced, or in a case of the same radio resources, a DCI detection success rate is improved.

Embodiment 2

Figure 4:
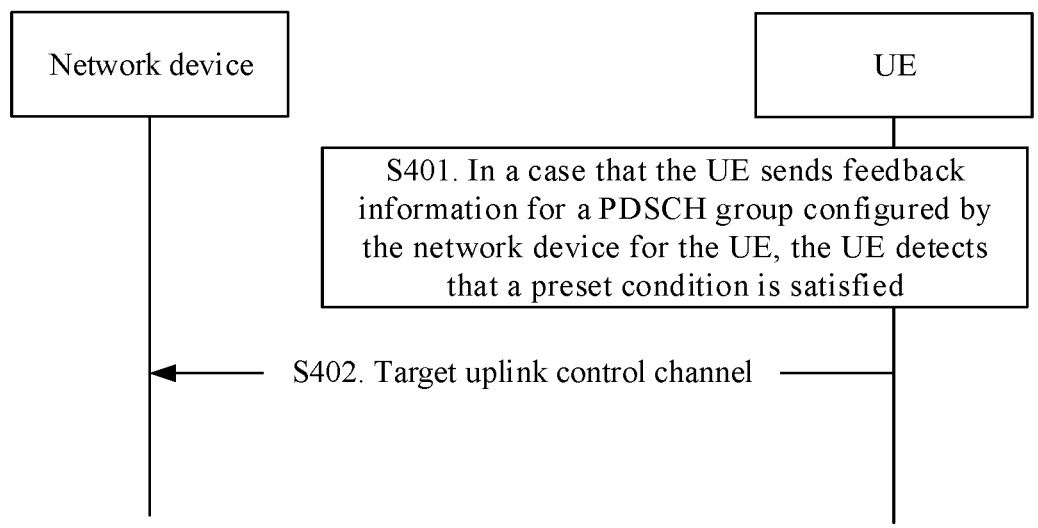
FIG. 4 is a third schematic flowchart of a method for feedback control according to an embodiment of this disclosure.

FIG. 4 shows a schematic flowchart of a method for feedback control according to an embodiment of this disclosure. As shown in FIG. 4, the method for feedback control may include step 401 and step 402.

Step 401: In a case that UE sends feedback information for a PDSCH group configured by a network device for the UE, the UE detects that a preset condition is satisfied.

Step b 402: The UE sends a target uplink control channel to the network device.

Correspondingly, the network device may receive the target uplink control channel from the UE.

The target uplink control channel carries at least one piece of first target feedback information, each piece of first target feedback information is HARQ-ACK information for one HARQ process, and HARQ processes for the at least one piece of first target feedback information are all HARQ processes configured by the network device.

Similarly, in this embodiment of this disclosure, the target uplink control channel may be the first uplink control channel. Similarly, for detailed descriptions of the target uplink control channel, reference may be made to the related description of the first uplink control channel in the foregoing Embodiment 1. Details are not repeated herein.

Optionally, the preset condition is at least one of the following conditions 1 to 4:

Condition 1: The number of PDSCH groups that is indicated by DCI received by the UE is greater than or equal to a first threshold.

Condition 2: The number of PDSCH groups that is indicated by the DCI received by the UE is P.

Condition 3: The number of bits of fourth feedback information is greater than or equal to a second threshold; and the fourth feedback information is HARQ-ACK information for all PDSCH groups that are indicated in the DCI received by the UE.

Condition 4: The UE receives target indication information, and the target indication information is used to indicate that the UE sends HARQ-ACK information for all HARQ processes that are configured by the network device for the UE.

Correspondingly, the network device may send the target indication information to the UE.

Similarly, in Embodiment 2 of this disclosure, for detailed descriptions of the conditions 1 to 4, reference may be made to the related description of the conditions 1 to 4 in the foregoing Embodiment 1. Details are not repeated herein.

Figure 5:
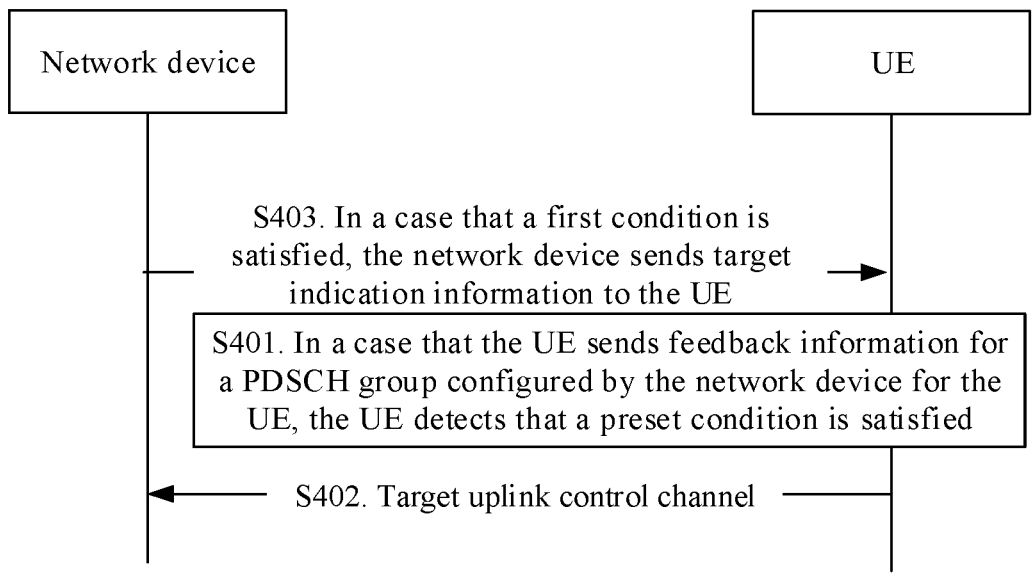
FIG. 5 is a fourth schematic flowchart of a method for feedback control according to an embodiment of this disclosure.

Optionally, as shown in FIG. 5, the method for feedback control provided by this embodiment of this disclosure may further include step 403 before step 401.

Step 403: In a case that a first condition is satisfied, the network device sends target indication information to the UE.

The first condition includes at least one of the following conditions 5 to 7.

Condition 5: The network device detects a feedback failure for all the HARQ processes configured by the network device.

Specifically, the network device has triggered the UE to send the feedback information for all the HARQ processes configured by the network device; however, the network device has not received HARQ-ACK information corresponding to any HARQ process and sent by the UE.

To be specific, when the network device has triggered the one-shot HARQ-ACK feedback but actual feedback fails (the network device has not successfully received corresponding feedback actually), the gNB continues to trigger the one-shot HARQ-ACK feedback.

Condition 6: All PDSCH groups applicable to the UE are occupied, and feedback for all the PDSCH groups fails.

For example, when all the PDSCH groups applicable to the UE are occupied and feedback for all the PDSCH groups fails, the network device has no available group for further scheduling downlink data for the UE.

In this case, even if the network device currently has no available PDSCH group to support HARQ-ACK feedback for downlink scheduling by the network device for the UE, the network device may alternatively trigger the UE to send HARQ-ACK information corresponding to existing PDSCH transmission.

Condition 7: No data that needs to be continuously sent to the UE is detected.

For example, that the data sent to the UE is not detected indicates that no downlink initial transmission and retransmission data for the UE needs to be continuously transmitted. Therefore, the network device may trigger the UE to send the HARQ-ACK information corresponding to the existing PDSCH transmission.

It should be emphasized that in this embodiment of this disclosure, in a case that the UE feeds back HARQ-ACK information by using the dynamic codebook-based HARQ-ACK reporting mechanism, or in a case that the UE feeds back HARQ-ACK information based on the one-shot HARQ-ACK reporting mechanism, the network device determines whether the first condition is satisfied, so as to trigger the UE to feed back HARQ-ACK information based on the one-shot HARQ-ACK reporting mechanism again.

Optionally, the target indication information is sent to the UE by the network device through common signaling.

Optionally, the target indication information is indicated by one bit in the common signaling.

Optionally, the common signaling further includes assistance information; the assistance information is used to indicate a data transmission state of each of all the HARQ processes that are configured by the network device; and the data transmission state is a scheduled state or an unscheduled state.

Similarly, in Embodiment 2 of this disclosure, for detailed descriptions of the target indication information, reference may be made to the description of the target indication information in the foregoing Embodiment 1. Details are not repeated herein.

In the method for feedback control provided by this embodiment of this disclosure, in a scenario in which the UE sends the feedback information for the PDSCH group that is configured by the network device for the UE, when the UE cannot successfully send the HARQ-ACK information corresponding to each PDSCH group to the network device, the network device may trigger the UE to send feedback information for all HARQ processes configured by the network device, that is, trigger the UE to send HARQ-ACK information corresponding to the existing PDSCH transmission. In this way, the dynamic codebook-based HARQ-ACK reporting mechanism is combined with the one-shot HARQ-ACK reporting mechanism, improving a probability of successful feedback based on the HARQ-ACK mechanism.

Embodiment 3

In a flowchart of a method for feedback control provided in an embodiment of this disclosure, the method for feedback control may include step 501 and step 502.

Step 501: A network device generates first DCI.

The first DCI is DCI for a first UE group, and the first UE group includes UE.

Specifically, after generating the first DCI, the network device may send the first DCI to the UE.

Step 502: The UE receives the first DCI from the network device.

The first DCI includes a first field, the first field is used to indicate whether HARQ-ACK information for at least one PDSCH group is carried on a first uplink control channel for transmission, the first field occupies P bits, and P is a maximum number of PDSCH groups applicable to the UE.

Optionally, the first uplink control channel is indicated by the first DCI, or the first uplink control channel is configured by the network device for the UE.

For example, the first uplink control channel may be configured by the network device for the UE by using RRC signaling.

P bits are occupied by the first field, that is, the number of bits occupied by the first field is the maximum number of PDSCH groups applicable to the UE. Specifically, the first field may be a bitmap, and a bit with a position index of n in the bitmap indicates a trigger state of a PDSCH group with an index of n.

Specifically, the bit with the position index of n in the bitmap may use 0 or 1 to indicate whether corresponding HARQ-ACK information for a PDSCH group with a group index of n needs to be fed back on a PUCCH resource indicated by the current DCI.

For example, a value of the bit with the position index of n is 1, indicating that the HARQ-ACK information corresponding to the PDSCH group with the group index of n needs to be carried on the PUCCH resource, indicated by the current DCI, for transmission; or a value of the bit with the position index of n is 0, indicating that the HARQ-ACK information corresponding to the PDSCH group with the group index of n does not need to be carried on the PUCCH resource, indicated by the current DCI, for transmission.

Optionally, the first DCI further includes first indication information, and the first indication information is used to indicate feedback bits of feedback information sent to the network device by the UE; or the first indication information is used to indicate the number of feedback bits for each PDSCH group, requiring feedback of HARQ-ACK information, of the at least one PDSCH group. The number of feedback bits is used to indicate bits occupied by feedback information sent by the UE.

To be specific, the first indication information is used to indicate the number of feedback bits of a codebook sent by the UE to the network device.

Optionally, in this embodiment of this disclosure, the first DCI further includes the first indication information, to facilitate consistent understanding between the UE and the network device on a size of the codebook for HARQ-ACK feedback and meanings of bits in the codebook, thereby improving a probability of successful HARQ-ACK feedback.

Optionally, the first indication information is a downlink assignment index DAI.

For example, when the first indication information is used to indicate the number of feedback bits for each UE in the first UE group, the first indication information may include one DAI. In a case that DAIS are uniformly numbered for all PDSCHs included in all PDSCH groups that actually require feedback of HARQ-ACK information and correspond to the HARQ-ACK information fed back by the current UE to the network device, the DAI may correspond to a DAI value corresponding to the last scheduled PDSCH. That is, the DAI may be used to indicate the number of feedback bits of the feedback information sent on the first uplink control channel.

In addition, when the first indication information is used to indicate the number of feedback bits for each PDSCH group, actually requiring feedback of HARQ-ACK information, in at least one PDSCH group, the number of PDSCH groups actually requiring feedback of HARQ-ACK information is K (K is a positive integer), and the first indication information includes K DAIS. One DAI is used to indicate the number of feedback bits for one corresponding PDSCH group actually requiring feedback of HARQ-ACK information, and the nth DAI included in the first indication information is corresponding to the nth PDSCH group that actually requires feedback of HARQ-ACK information and that is indicated in the bitmap.

Optionally, the method for feedback control provided by this embodiment of this disclosure may further include step 503 after step 502.

Step 503: The UE sends the first uplink control channel to the network device.

The UE may send the first uplink control channel to the network device by using the dynamic codebook-based hybrid automatic repeat request acknowledgment HARQ-ACK reporting mechanism.

Correspondingly, the network device may receive the first uplink control channel from the UE.

At least one piece of first feedback information is carried on the first uplink control channel, and each piece of first feedback information is HARQ-ACK information for one PDSCH group.

Similarly, in Embodiment 3 of this disclosure, for detailed descriptions of the first uplink control channel, reference may be made to the related description of the first uplink control channel in the foregoing Embodiment 1. Details are not repeated herein.

Optionally, the method for feedback control provided by this embodiment of this disclosure may further include step 504, for example, further include step 504 after step 502.

Step 504: In a case that it is detected that a preset condition is satisfied, the UE sends a second uplink control channel to the network device.

The UE may send the second uplink control channel to the network device based on the one-shot HARQ-ACK reporting mechanism.

Correspondingly, the network device may receive the second downlink control channel from the UE.

The second uplink control channel carries at least one piece of second feedback information, each piece of second feedback information is HARQ-ACK information for one HARQ process, and HARQ process(es) corresponding to the at least one piece of second feedback information are all HARQ processes configured by the network device.

Optionally, the preset conditions 1 to 3 are at least one of the following:

Condition 1: The number of PDSCH groups that is indicated by DCI received by the UE is greater than or equal to a first threshold.

Condition 2: The number of PDSCH groups that is indicated by the DCI received by the UE is P.

Condition 3: The number of bits of fourth feedback information is greater than or equal to a second threshold; and the fourth feedback information is HARQ-ACK information for all PDSCH groups that are indicated in the DCI received by the UE.

It can be understood that in a scenario of the first DCI being group signaling, the bitmap (which is the first field) in the first DCI may trigger, in combination with the conditions 1 to 3, the UE to send feedback information based on the one-shot HARQ-ACK reporting mechanism. In other words, the UE sends the HARQ-ACK information for all the HARQ processes configured by the network device for the UE.

Similarly, in Embodiment 3 of this disclosure, for detailed descriptions of the conditions 1 to 3, reference may be made to the related description of the conditions 1 to 3 in the foregoing Embodiment 1. Details are not repeated herein.

In the method for feedback control provided in this embodiment of this disclosure, in a scenario in which the network device schedules a PDSCH for the UE by using signaling DCI for the UE group, the DCI may include a first field, where the first field may indicate whether the HARQ-ACK information corresponding to each PDSCH group needs to be carried on the PUCCH indicated by the DCI, for transmission. In this way, because the signaling DCI for the UE group occupies fewer resources than DCI configured separately for individual UEs by the network device, resource overheads of the network is reduced for implementation of the same trigger function.

Embodiment 4

Figure 6:
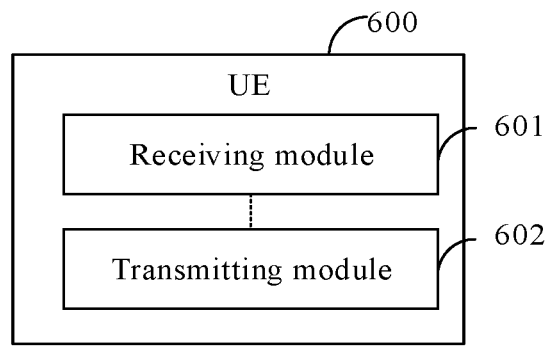
FIG. 6 is a first schematic structural diagram of UE according to an embodiment of this disclosure.

FIG. 6 is a possible schematic structural diagram of UE according to an embodiment of this disclosure. As shown in FIG. 6, the UE 600 includes a receiving module 601. The receiving module 601 is configured to receive first downlink control information DCI from a network device, where the first DCI includes a first field, and the first field is used to indicate whether hybrid automatic repeat request acknowledgment HARQ-ACK information for at least one physical downlink shared channel PDSCH group is carried on a first uplink control channel for transmission. The first uplink control channel is indicated by the first DCI, the first field occupies M bits, M is a positive integer less than P, and P is a maximum number of PDSCH groups applicable to the UE.

Optionally, M is equal to P minus 1.

Optionally, the first DCI is further used to indicate a first PDSCH group, the first PDSCH group is indicated by one first index, each of the at least one PDSCH group is indicated by one second index, and each second index corresponds to one of the M bits; where, for each second index:
  in a case that one second index is less than the first index, a position index of a bit corresponding to the one second index is the same as the one second index; or in a case that one second index is greater than the first index, a position index of a bit corresponding to the one second index equals the one second index minus 1.

Optionally, the first DCI further includes a second field, the second field is used to indicate the first PDSCH group, and the second field occupies T bits; and T is determined based on P.

Optionally, T is obtained by rounding up a floating point number of K, and K is obtained by logarithm base 2 of P.

Optionally, the UE 600 further includes a transmitting module 602. The transmitting module 602 is configured to: after the first DCI is received from the network device by the receiving module, send a first uplink control channel to the network device, where the first uplink control channel carries at least one piece of first feedback information, and each piece of first feedback information is HARQ-ACK information for one PDSCH group.

Optionally, the transmitting module 602 is further configured to: in a case that it is detected that a preset condition is satisfied, send a second uplink control channel to the network device, where the second uplink control channel carries at least one piece of second feedback information, each piece of second feedback information is HARQ-ACK information for one HARQ process, and HARQ process(es) corresponding to the at least one piece of second feedback information are all HARQ processes configured by the network device for the UE.

Optionally, the preset condition is at least one of the following: the number of PDSCH groups that is indicated by DCI received by the UE 600 is greater than or equal to a first threshold, the number of PDSCH groups that is indicated by the DCI received by the UE 600 is P, the number of bits of fourth feedback information is greater than or equal to a second threshold, or the UE 600 receives target indication information; and the fourth feedback information is HARQ-ACK information for all PDSCH groups that are indicated in the DCI received by the UE 600, and the target indication information is used to indicate the UE 600 to send HARQ-ACK information for all HARQ processes that are configured by the network device for the UE.

Optionally, the target indication information is sent to the UE by the network device through common signaling.

Optionally, the target indication information is indicated by one bit in the common signaling.

Optionally, the common signaling further includes assistance information; the assistance information is used to indicate a data transmission state of each of all the HARQ processes that are configured by the network device for the UE; and the data transmission state is a scheduled state or an unscheduled state.

The UE provided in this embodiment of this application can implement the processes shown in any one of FIG. 2 to FIG. 4 in the foregoing method embodiments. To avoid repetition, details are not described herein again.

For the UE provided in this embodiment of this disclosure, in a scenario in which the network device schedules a PDSCH for the UE by using DCI, for the first PDSCH group to which the PDSCH currently scheduled in the DCI belongs, the UE usually needs to have HARQ-ACK information corresponding to the first PDSCH group carried on a PUCCH indicated by the DCI, for transmission. In this way, a bit corresponding to the first PDSCH group does not need to be set in the first field of the DCI, where the bit is used to specially indicate whether the UE needs to have the HARQ-ACK information corresponding to the first PDSCH group carried the PUCCH indicated by the DCI, for transmission. Specifically, for other PDSCH groups than the first PDSCH group in the available PDSCH groups (whose quantity is P) for the UE, all bits in the first field are set to be in one-to-one correspondence to all of the other PDSCH groups, so that the UE can learn about all PDSCH groups for which HARQ-ACK information needs to be carried on the PUCCH indicated by the DCI, for transmission. Therefore, the number M of bits occupied by the first field may be less than P, that is, M is less than the number of PDSCH groups applicable to the UE. This reduces the number of bits of the field, in the DCI, used for indicating a PDSCH group for which HARQ-ACK information needs to be sent, that is, reduces bit overheads. This helps reduce the number of bits of the DCI, and therefore, in a case of the same DCI detection success rate, radio resources that need to be occupied by DCI transmission are reduced, or in a case of the same radio resources, a DCI detection success rate is improved.

Embodiment 5

Figure 7:
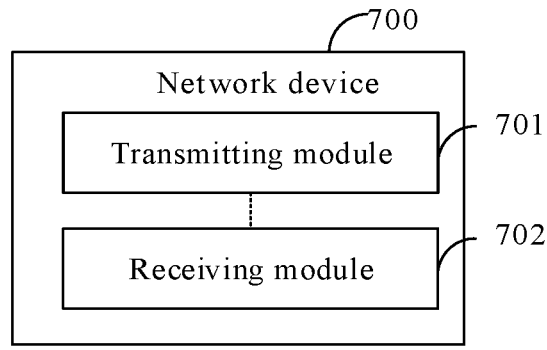
FIG. 7 is a first schematic structural diagram of a network device according to an embodiment of this disclosure.

FIG. 7 is a possible schematic structural diagram of a network device according to an embodiment of this disclosure. As shown in FIG. 7, the network device 700 includes a transmitting module 701. The transmitting module 701 is configured to send first downlink control information DCI to UE, where the first DCI includes a first field, and the first field is used to indicate whether hybrid automatic repeat request acknowledgment HARQ-ACK information for at least one physical downlink shared channel PDSCH group is carried on a first uplink control channel for transmission. The first uplink control channel is indicated by the first DCI, the first field occupies M bits, M is a positive integer less than P, and P is a maximum number of PDSCH groups applicable to the UE.

Optionally, M is equal to P minus 1.

Optionally, the first DCI is further used to indicate a first PDSCH group, the first PDSCH group is indicated by one first index, each of the at least one PDSCH group is indicated by one second index, and each second index corresponds to one of the M bits; where, for each second index:

in a case that one second index is less than the first index, a position index of a bit corresponding to the one second index is the same as the one second index; or in a case that one second index is greater than the first index, a position index of a bit corresponding to the one second index equals the one second index minus 1.

Optionally, the first DCI further includes a second field, the second field is used to indicate the first PDSCH group, and the second field occupies T bits; and T is determined based on P.

Optionally, T is obtained by rounding up a floating point number of K, and K is obtained by logarithm base 2 of P.

Optionally, the network device 700 further includes a receiving module 702. The receiving module 702 is configured to: after the first DCI is sent to the UE by the transmitting module 701, receive a first uplink control channel from the UE, where the first uplink control channel carries at least one piece of first feedback information, and each piece of first feedback information is HARQ-ACK information for one PDSCH group.

Optionally, the receiving module 702 is further configured to receive a second uplink control channel from the UE, where the second uplink control channel carries at least one piece of second feedback information, each piece of second feedback information is HARQ-ACK information for one HARQ process, and HARQ process(es) corresponding to the at least one piece of second feedback information are all HARQ processes configured by the network device for the UE.

Optionally, the transmitting module 701 is further configured to: before the receiving module 702 receives the second uplink control channel from the UE, send target indication information to the UE, where the target indication information is used to indicate that the UE sends HARQ-ACK information for all HARQ processes that are configured by the network device for the UE.

Optionally, the target indication information is sent through common signaling.

Optionally, the target indication information is indicated by one bit in the common signaling.

Optionally, the common signaling further includes assistance information; the assistance information is used to indicate a data transmission state of each of all the HARQ processes that are configured by the network device for the UE; and the data transmission state is a scheduled state or an unscheduled state.

The network device provided in this embodiment of this disclosure can implement the processes shown in any one of FIG. 2 to FIG. 4 in the foregoing method embodiments. To avoid repetition, details are not described herein again.

For the network device provided in this embodiment of this disclosure, in a scenario in which the network device schedules a PDSCH for the UE by using DCI, for the first PDSCH group to which the PDSCH currently scheduled in the DCI belongs, the UE usually needs to have HARQ-ACK information corresponding to the first PDSCH group carried on a PUCCH indicated by the DCI, for transmission. In this way, a bit corresponding to the first PDSCH group does not need to be set in the first field of the DCI by the network device, where the bit is used to specially indicate whether the UE needs to have the HARQ-ACK information corresponding to the first PDSCH group carried on the PUCCH indicated by the DCI, for transmission. Specifically, for other PDSCH groups than the first PDSCH group in the available PDSCH groups (whose quantity is P) for the UE, all bits in the first field are set to be in one-to-one correspondence to all of the other PDSCH groups, so that the UE can learn about all PDSCH groups for which HARQ-ACK information needs to be carried on the PUCCH indicated by the DCI, for transmission. Therefore, the number M of bits occupied by the first field may be less than P, that is, M is less than the number of PDSCH groups applicable to the UE. This reduces the number of bits of the field, in the DCI, used for indicating a PDSCH group for which HARQ-ACK information needs to be sent, that is, reduces bit overheads. This helps reduce the number of bits of the DCI, and therefore, in a case of the same DCI detection success rate, radio resources that need to be occupied by DCI transmission are reduced, or in a case of the same radio resources, a DCI detection success rate is improved.

Embodiment 6

FIG. 6 is a possible schematic structural diagram of UE according to an embodiment of the present invention. As shown in FIG. 6, the UE 600 includes a transmitting module 602. The transmitting module 602 is configured to: in a case that the UE 600 sends hybrid automatic repeat request acknowledgment HARQ-ACK information for a physical downlink shared channel PDSCH group that is configured by a network device for the UE 600, and it is detected that a preset condition is satisfied, send a target uplink control channel to the network device, where the target uplink control channel carries at least one piece of first target feedback information, each piece of first target feedback information is hybrid automatic repeat request acknowledgment HARQ-ACK information for one hybrid automatic repeat request HARQ process, and HARQ processes for the at least one piece of first target feedback information are all HARQ processes configured by the network device for the UE.

Optionally, the preset condition is at least one of the following: the number of resource groups that is indicated by downlink control information DCI received by the UE 600 is greater than or equal to a first threshold, the number of resource groups that is indicated by the DCI received by the UE 600 is P, the number of bits of second target feedback information is greater than or equal to a second threshold, or the UE 600 receives target indication information; and the second target feedback information is feedback information for a resource group that is indicated in the DCI received by the UE 600, and the target indication information is used to indicate the UE 600 to send feedback information for all HARQ processes that are configured by the network device for the UE. P is a maximum number of PDSCH groups applicable to the UE.

Optionally, the target indication information is sent to the UE by the network device through common signaling.

Optionally, the target indication information is indicated by one bit in the common signaling.

Optionally, the common signaling further includes assistance information; the assistance information is used to indicate a data transmission state of each of all the HARQ processes that are configured by the network device for the UE; and the data transmission state is a scheduled state or an unscheduled state.

The UE provided in this embodiment of this application can implement the processes shown in FIG. 5 in the foregoing method embodiment. To avoid repetition, details are not described herein again.

In the UE provided by this embodiment of this disclosure, in a scenario in which the UE sends the feedback information for the PDSCH group that is configured by the network device for the UE, when the UE cannot successfully send the HARQ-ACK information corresponding to each PDSCH group to the network device, the UE may send feedback information for all HARQ processes configured by the network device, that is, send HARQ-ACK information corresponding to existing PDSCH transmission. In this way, the dynamic codebook-based HARQ-ACK reporting mechanism is combined with the one-shot HARQ-ACK reporting mechanism, improving a probability of successful feedback based on the HARQ-ACK mechanism.

Embodiment 7

FIG. 7 is a possible schematic structural diagram of a network device according to an embodiment of this disclosure. As shown in FIG. 7, the network device 700 includes a receiving module 702. The receiving module 702 is configured to receive a target uplink control channel from user equipment UE, where the target uplink control channel carries at least one piece of first target feedback information, each piece of first target feedback information is HARQ-ACK information for one HARQ process, and HARQ processes corresponding to the at least one piece of first target feedback information are all HARQ processes configured by the network device for the UE.

Optionally, the network device 700 further includes a transmitting module 701. The transmitting module 701 is configured to: before the receiving module 702 receives the target uplink control channel from the UE, in a case that it is detected that a first condition is satisfied, send target indication information to the user equipment UE, where the target indication information is used to indicate tha the UE sends feedback information for all HARQ processes that are configured by the network device for the UE; where the first condition includes at least one of the following: a feedback failure for all the HARQ processes configured by the network device for the UE is detected; all PDSCH groups applicable to the UE are occupied, and feedback for all the available PDSCH groups fails; or no data that needs to be sent to the UE is detected.

Optionally, the target indication information is sent to the UE by the network device through common signaling.

Optionally, the target indication information is indicated by one bit in the common signaling.

Optionally, the common signaling further includes assistance information; the assistance information is used to indicate a data transmission state of each of all the HARQ processes that are configured by the network device for the UE; and the data transmission state is a scheduled state or an unscheduled state.

The network device provided in this embodiment of this application can implement the processes shown in FIG. 5 in the foregoing method embodiment. To avoid repetition, details are not described herein again.

In the network device provided by this embodiment of this disclosure, in a scenario in which the UE sends the feedback information for the PDSCH group that is configured by the network device for the UE, when the UE cannot successfully send the HARQ-ACK information corresponding to each PDSCH group to the network device, the network device may trigger the UE by using the DCI to send feedback information for all HARQ processes configured by the network device, that is, trigger the UE to send HARQ-ACK information corresponding to existing PDSCH transmission. In this way, the dynamic codebook-based HARQ-ACK reporting mechanism is combined with the one-shot HARQ-ACK reporting mechanism, improving a probability of successful feedback based on the HARQ-ACK mechanism.

Embodiment 8

FIG. 6 is a possible schematic structural diagram of UE according to an embodiment of this disclosure. As shown in FIG. 6, the UE 600 includes a receiving module 601. The receiving module 601 is configured to receive first downlink control information DCI from a network device, where the first DCI includes a first field, and the first field is used to indicate whether hybrid automatic repeat request acknowledgment HARQ-ACK information for at least one physical downlink shared channel PDSCH group is carried on a first uplink control channel for transmission; and the first DCI is DCI for a first UE group, the first UE group includes the UE 600, the first field occupies P bits, and P is a maximum number of PDSCH groups applicable to the UE 600.

Optionally, the first uplink control channel is indicated by the first DCI, or the first uplink control channel is configured by the network device for the UE 600.

Optionally, the first DCI further includes first indication information, and the first indication information is used to indicate feedback bits for each UE in the first UE group; or the first indication information is used to indicate the number of feedback bits for each of the at least one PDSCH group. The number of feedback bits is used to indicate bits occupied by feedback information sent by the UE.

Optionally, the first indication information is a downlink assignment index DAI.

Optionally, the UE 600 further includes a transmitting module 602. The transmitting module 602 is configured to: after the first DCI is received from the network device by the receiving module 601, send a first uplink control channel to the network device, where the first uplink control channel carries at least one piece of first feedback information, and each piece of first feedback information is HARQ-ACK information for one PDSCH group.

Optionally, the transmitting module 602 is further configured to: in a case that it is detected that a preset condition is satisfied, send a second uplink control channel to the network device, where the second uplink control channel carries at least one piece of second feedback information, each piece of second feedback information is HARQ-ACK information for one HARQ process, and HARQ process(es) corresponding to the at least one piece of second feedback information are all HARQ processes configured by the network device for the UE.

Optionally, the preset condition is at least one of the following: the number of PDSCH groups that is indicated by DCI received by the UE 600 is greater than or equal to a first threshold, the number of PDSCH groups that is indicated by the DCI received by the UE 600 is P, or the number of bits of fourth feedback information is greater than or equal to a second threshold; and the fourth feedback information is HARQ-ACK information for all PDSCH groups that are indicated in the DCI received by the UE 600.

For the UE provided in this embodiment of this disclosure, in a scenario in which the network device schedules a PDSCH for the UE by using signaling DCI for the UE group, the DCI may include a first field, where the first field may indicate whether the HARQ-ACK information corresponding to each PDSCH group needs to be carried on the PUCCH indicated by the DCI, for transmission. In this way, because the signaling DCI for the UE group occupies fewer resources than DCI configured separately for individual UEs by the network device, a probability of successful transmission of the DCI for scheduling the PDSCH for the UE is relatively high (for example, in a case with fewer idle resources in a network environment), and a probability of successfully sending, by the UE based on an indication of the DCI, HARQ-ACK information carried on the PUCCH. In other words, this helps improve a probability of successful feedback based on the HARQ-ACK reporting mechanism.

Embodiment 9

FIG. 7 is a possible schematic structural diagram of a network device according to an embodiment of this disclosure. As shown in FIG. 7, the UE 700 includes a transmitting module 701. The transmitting module 601 is configured to send first downlink control information DCI to user equipment UE, where the first DCI includes a first field, and the first field is used to indicate whether hybrid automatic repeat request acknowledgment HARQ-ACK information for at least one physical downlink shared channel PDSCH group is carried on a first uplink control channel for transmission; and the first DCI is DCI for a first UE group, the first UE group includes the UE 600, the first field occupies P bits, and P is a maximum number of PDSCH groups applicable to the UE.

Optionally, the first uplink control channel is indicated by the first DCI, or the first uplink control channel is configured by the network device for the UE.

Optionally, the first DCI further includes first indication information, and the first indication information is used to indicate feedback bits for each UE in the first UE group; or the first indication information is used to indicate the number of feedback bits for each of the at least one PDSCH group. The number of feedback bits is used to indicate bits occupied by feedback information sent by the UE.

Optionally, the first indication information is a downlink assignment index DAI.

Optionally, the network device 700 further includes a receiving module 702. The receiving module 702 is configured to: after the first DCI is sent to the UE by the transmitting module 701, receive a first uplink control channel from the UE, where the first uplink control channel carries at least one piece of first feedback information, and each piece of first feedback information is HARQ-ACK information for one PDSCH group.

Optionally, the receiving module 702 is further configured to receive a second uplink control channel from the UE, where the second uplink control channel carries at least one piece of second feedback information, each piece of second feedback information is HARQ-ACK information for one HARQ process, and HARQ process(es) corresponding to the at least one piece of second feedback information are all HARQ processes configured by the network device for the UE.

For the network device provided in this embodiment of this disclosure, in a scenario in which the network device schedules a PDSCH for the UE by using signaling DCI for the UE group, the DCI may include a first field, where the first field may indicate whether the HARQ-ACK information corresponding to each PDSCH group needs to be carried on the PUCCH indicated by the DCI, for transmission. In this way, because the signaling DCI for the UE group occupies fewer resources than DCI configured separately for individual UEs by the network device, a probability of successful transmission of the DCI for scheduling the PDSCH for the UE is relatively high (for example, in a case with fewer idle resources in a network environment), and a probability of successfully sending, based on an indication of the DCI, HARQ-ACK information carried on the PUCCH. In other words, this helps improve a probability of successful feedback based on the HARQ-ACK reporting mechanism.

Embodiment 10

Figure 8:
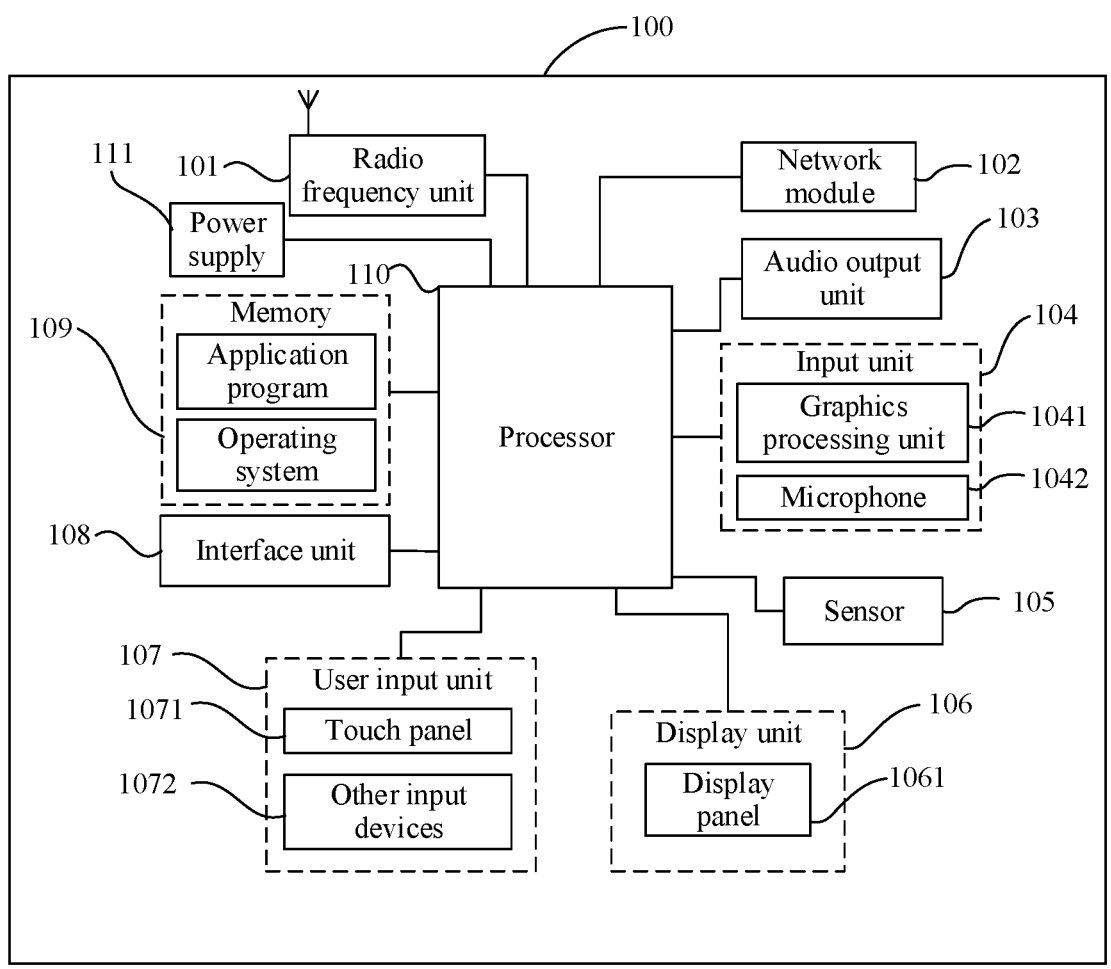
FIG. 8 is a second schematic structural diagram of UE according to an embodiment of this disclosure.

FIG. 8 is a schematic structural diagram of hardware of UE for implementing the embodiments of this disclosure. The UE 100 includes but is not limited to components such as a radio frequency unit 101, a network module 102, an audio output unit 103, an input unit b 104, a sensor 105, a display unit 106, user input unit 107, an interface unit 108, a memory 109, a processor 110, and a power supply 111. Persons skilled in the art can understand that a structure of the UE 100 shown in FIG. 8 does not constitute any limitation on the UE, and the UE 100 may include more or fewer components than those shown in the figure, or a combination of some components, or the components disposed differently. In this embodiment of this disclosure, the UE 100 includes but is not limited to a mobile phone, a tablet computer, a laptop computer, a palmtop computer, an in-vehicle terminal device, a wearable device, a pedometer, and the like.

Optionally, the interface unit 108 is configured to receive first downlink control information DCI from a network device, where the first DCI includes a first field, and the first field is used to indicate whether hybrid automatic repeat request acknowledgment HARQ-ACK information for at least one physical downlink shared channel PDSCH group is carried on a first uplink control channel for transmission. The first uplink control channel is indicated by the first DCI, the first field occupies M bits, M is a positive integer less than P, and P is a maximum number of PDSCH groups applicable to the UE.

For the UE provided in this embodiment of this disclosure, in a scenario in which the network device schedules a PDSCH for the UE by using DCI, for the first PDSCH group to which the PDSCH currently scheduled in the DCI belongs, the UE usually needs to have HARQ-ACK information corresponding to the first PDSCH group carried on a PUCCH indicated by the DCI, for transmission. In this way, a bit corresponding to the first PDSCH group does not need to be set in the first field of the DCI, where the bit is used to specially indicate whether the UE needs to have the HARQ-ACK information corresponding to the first PDSCH group carried on the PUCCH indicated by the DCI, for transmission. Specifically, for other PDSCH groups than the first PDSCH group in the available PDSCH groups (whose quantity is P) for the UE, all bits in the first field are set to be in one-to-one correspondence to all of the other PDSCH groups, so that the UE can learn about all PDSCH groups for which HARQ-ACK information needs to be carried on the PUCCH indicated by the DCI, for transmission. Therefore, the number M of bits occupied by the first field may be less than P, that is, M is less than the number of PDSCH groups applicable to the UE. This reduces the number of bits of the field, in the DCI, used for indicating a PDSCH group for which HARQ-ACK information needs to be sent, that is, reduces bit overheads. This helps improve applicability of HARQ-ACK feedback in various network environments, and helps improve a probability of successfully sending HARQ-ACK information to the network device by the UE.

Optionally, the radio frequency unit 101 is configured to: in a case that the UE sends feedback information for a physical downlink shared channel PDSCH group that is configured by a network device for the UE, and it is detected that a preset condition is satisfied, send a target uplink control channel to the network device, where the target uplink control channel carries at least one piece of first target feedback information, each piece of first target feedback information is hybrid automatic repeat request acknowledgment HARQ-ACK information for one hybrid automatic repeat request HARQ process, and HARQ processes for the at least one piece of first target feedback information are all HARQ processes configured by the network device.

In the UE provided by this embodiment of this disclosure, in a scenario in which the UE sends the feedback information for the PDSCH group that is configured by the network device for the UE, when the UE cannot successfully send the HARQ-ACK information corresponding to each PDSCH group to the network device, the UE may send feedback information for all HARQ processes configured by the network device, that is, send HARQ-ACK information corresponding to existing PDSCH transmission. In this way, the dynamic codebook-based HARQ-ACK reporting mechanism is combined with the one-shot HARQ-ACK reporting mechanism, improving a probability of successful feedback based on the HARQ-ACK mechanism.

Optionally, the interface unit 108 is configured to receive first downlink control information DCI from the network device, where the first DCI includes a first field, and the first field is used to indicate whether hybrid automatic repeat request acknowledgment HARQ-ACK information for at least one physical downlink shared channel PDSCH group is carried on a first uplink control channel for transmission; the first DCI is DCI for a first UE group, and the first UE group includes the UE; and the first field occupies P bits, and P is a maximum number of PDSCH groups applicable to the UE.

For the UE provided in this embodiment of this disclosure, in a scenario in which the network device schedules a PDSCH for the UE by using signaling DCI for the UE group, the DCI may include a first field, where the first field may indicate whether the HARQ-ACK information corresponding to each PDSCH group needs to be carried on the PUCCH indicated by the DCI, for transmission. In this way, because the signaling DCI for the UE group occupies fewer resources than DCI configured separately for individual UEs by the network device, a probability of successful transmission of the DCI for scheduling the PDSCH for the UE is relatively high (for example, in a case with fewer idle resources in a network environment), resulting in a higher probability of successfully sending, by the UE based on an indication of the DCI, HARQ-ACK information carried on the PUCCH. In other words, this helps improve a probability of successful feedback based on the HARQ-ACK reporting mechanism.

It should be understood that in this embodiment of this disclosure, the radio frequency unit 101 may be configured to receive and send information, or to receive and send a signal in a call process, and specially, after receiving downlink data from a base station, send the downlink data to the processor 110 for processing; and also send uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may also communicate with a network and other devices via a wireless communications system.

The UE 100 provides the user with wireless broadband Internet access through the network module 102, for example, helping the user to send and receive e-mails, browse web pages, and access streaming media.

The audio output unit 103 may convert audio data received by the radio frequency unit 101 or the network module 102 or stored in the memory 109 into an audio signal and output the audio signal as a sound. In addition, the audio output unit 103 may also provide audio output (for example, a call signal reception sound or a message reception sound) related to a specific function performed by the UE 100. The audio output unit 103 includes a speaker, a buzzer, a receiver, and the like.

The input unit 104 is configured to receive an audio or video signal. The input unit 104 may include a graphics processing unit (GPU) 1041 and a microphone 1042. The graphics processing unit 1041 processes image data of a still picture or video obtained by an image capture apparatus (such as a camera) in a video capture mode or an image capture mode. A processed image frame may be displayed on the display unit 106. The image frame processed by the graphics processing unit 1041 may be stored in the memory 109 (or another storage medium) or be sent by the radio frequency unit 101 or the network module 102. The microphone 1042 is capable of receiving sounds and processing such sounds into audio data. The processed audio data can be converted into a format output that can be sent to a mobile communication base station through the radio frequency unit 101 in a telephone call mode.

The UE 100 further includes at least one sensor 105, for example, an optical sensor, a motion sensor, and another sensor. Specifically, the optical sensor may include an ambient light sensor and a proximity sensor. The ambient light sensor may adjust luminance of the display panel 1061 based on brightness of ambient light, and the proximity sensor may turn off the display panel 1061 and/or backlight when the UE 100 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal device, functions related to vibration recognition (such as pedometer and tapping), and the like. The sensor 105 may also include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information input by the user or information provided to the user. The display unit 106 may include a display panel 1061, and the display panel 1061 may be configured in a form of a liquid crystal display (LCD), an organic light-emitting diode (OLED), or the like.

The user input unit 107 may be configured to receive input digit or character information, and generate a key signal input related to a user setting and function control of the UE 100. Specifically, the user input unit 107 may include a touch panel 1071 and other input devices 1072. The touch panel 1071 is also referred to as a touchscreen and can collect a touch operation (such as an operation performed by the user on the touch panel 1071 or near the touch panel 1071 with a finger or by using any proper object or accessory such as a stylus) of the user on or near the touch panel 1071. The touch panel 1071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 110, and can receive a command sent by the processor 110 and execute the command. In addition, the touch panel 1071 may be implemented in a plurality of forms, for example, as a resistive, capacitive, infrared, or surface acoustic wave touch panel. In addition to the touch panel 1071, the user input unit 107 may further include other input devices 1072. Specifically, the other input devices 1072 may include but are not limited to a physical keyboard, a function key (such as a volume control key or a switch key), a trackball, a mouse, and a joystick. Details are not described herein.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides a corresponding visual output on the display panel 1061 based on the type of the touch event. In FIG. 8, the touch panel 1071 and the display panel 1061 serve as two independent components to implement input and output functions of the terminal. In some embodiments, however, the touch panel 1071 may be integrated with the display panel 1061 to implement the input and output functions of the terminal. Details are not limited herein.

The interface unit 108 is an interface between an external apparatus and the UE 100. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 108 may be configured to receive an input (for example, data information or power) from an external apparatus and transmit the received input to one or more elements within the UE 100, or may be configured to transmit data between the UE 100 and the external apparatus.

The memory 109 may be configured to store software programs and various data. The memory 109 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 109 may include a high-speed random access memory, and may further include a non-volatile memory such as a disk storage device, a flash memory device, or another volatile solid-state storage device.

The processor 110 is a control center of the UE 100. The processor 109 uses various interfaces and lines to connect all parts of the entire UE 100, and performs various functions and data processing of the UE 100 by running or executing the software program and/or module stored in the memory 109 and invoking data stored in the memory 109, thereby performing overall monitoring on the UE 100. The processor 110 may include one or more processing units. Optionally, an application processor and a modem processor may be integrated in the processor 110. The application processor primarily processes an operating system, user interfaces, application programs, and the like. The modem processor primarily processes radio communication. It can be understood that the modem processor may alternatively be not integrated in the processor 110.

The UE 100 may further include the power supply 111 (for example, a battery) supplying power to all components. Optionally, the power supply 111 may be logically connected to the processor 110 through a power management system. In this way, functions such as charge management, discharge management, and power consumption management are implemented by using the power management system.

In addition, the UE 100 includes some functional modules that are not shown. Details are not described herein.

Embodiment 11

Figure 9:
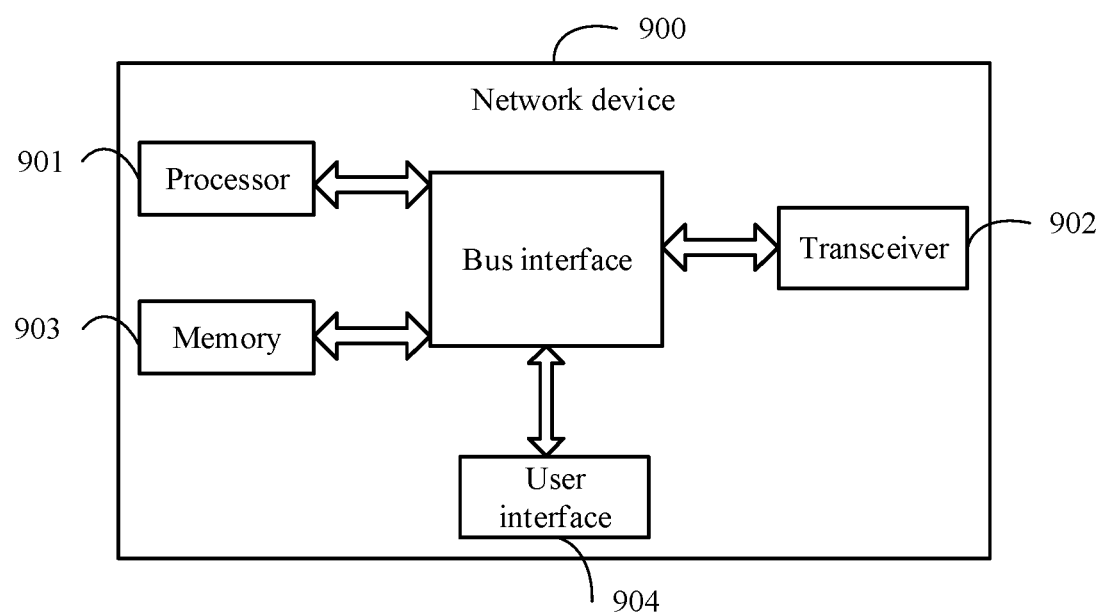
FIG. 9 is a second schematic structural diagram of a network device according to an embodiment of this disclosure.

FIG. 9 is a schematic diagram of a hardware structure of a network device for implementing an embodiment of this disclosure. The network device 900 includes a processor 901, a transceiver 902, a memory 903, a user interface 904, and a bus interface.

Optionally, the transceiver 902 is configured to send first downlink control information DCI to UE, where the first DCI includes a first field, and the first field is used to indicate whether hybrid automatic repeat request acknowledgment HARQ-ACK information for at least one physical downlink shared channel PDSCH group is carried on a first uplink control channel for transmission. The first uplink control channel is indicated by the first DCI, the first field occupies M bits, M is a positive integer less than P, and P is a maximum number of PDSCH groups applicable to the UE.

For the network device provided in this embodiment of this disclosure, in a scenario in which the network device schedules a PDSCH for the UE by using DCI, for the first PDSCH group to which the PDSCH currently scheduled in the DCI belongs, the UE usually needs to have HARQ-ACK information corresponding to the first PDSCH group carried on a PUCCH indicated by the DCI, for transmission. In this way, a bit corresponding to the first PDSCH group does not need to be set in the first field of the DCI by the network device, where the bit is used to specially indicate whether the UE needs to have the HARQ-ACK information corresponding to the first PDSCH group carried on the PUCCH indicated by the DCI, for transmission. Specifically, for other PDSCH groups than the first PDSCH group in the available PDSCH groups (whose quantity is P) for the UE, all bits in the first field are set to be in one-to-one correspondence to all of the other PDSCH groups, so that the UE can learn about all PDSCH groups for which HARQ-ACK information needs to be carried on the PUCCH indicated by the DCI, for transmission. Therefore, the number M of bits occupied by the first field may be less than P, that is, M is less than the number of PDSCH groups applicable to the UE.

This reduces the number of bits of the field, in the DCI, used for indicating a PDSCH group for which HARQ-ACK information needs to be sent, that is, reduces bit overheads. This helps improve applicability of HARQ-ACK feedback in various network environments, and helps improve a probability of successfully sending HARQ-ACK information to the network device by the UE, further improving correctness of receiving the feedback information by the network device.

Optionally, the transceiver 902 is configured to receive a target uplink control channel from user equipment UE, where the target uplink control channel carries at least one piece of first target feedback information, each piece of first target feedback information is hybrid automatic repeat request acknowledgment HARQ-ACK information for one hybrid automatic repeat request HARQ process, and HARQ processes for the at least one piece of first target feedback information are all HARQ processes configured by the network device.

In the network device provided by this embodiment of this disclosure, in a scenario in which the UE sends the feedback information for the PDSCH group that is configured by the network device for the UE, when the UE cannot successfully send the HARQ-ACK information corresponding to each PDSCH group to the network device, the network device may trigger the UE by using the DCI to send feedback information for all HARQ processes configured by the network device, that is, trigger the UE to send HARQ-ACK information corresponding to existing PDSCH transmission. In this way, the dynamic codebook-based HARQ-ACK reporting mechanism is combined with the one-shot HARQ-ACK reporting mechanism, improving a probability of successful feedback based on the HARQ-ACK mechanism.

Optionally, the transceiver 902 is configured to send first downlink control information DCI to user equipment UE, where the first DCI includes a first field, and the first field is used to indicate whether hybrid automatic repeat request acknowledgment HARQ-ACK information for at least one physical downlink shared channel PDSCH group is carried on a first uplink control channel for transmission; the first DCI is DCI for a first UE group, and the first UE group includes the UE; and the first field occupies P bits, and P is a maximum number of PDSCH groups applicable to the UE.

For the network device provided in this embodiment of this disclosure, in a scenario in which the network device schedules a PDSCH for the UE by using signaling DCI for the UE group, the DCI may include a first field, where the first field may indicate whether the HARQ-ACK information corresponding to each PDSCH group needs to be carried on the PUCCH indicated by the DCI, for transmission. In this way, because the signaling DCI for the UE group occupies fewer resources than DCI configured separately for individual UEs by the network device, a probability of successful transmission of the DCI for scheduling the PDSCH for the UE is relatively high (for example, in a case with fewer idle resources in a network environment), and a probability of successfully sending, based on an indication of the DCI, HARQ-ACK information carried on the PUCCH. In other words, this helps improve a probability of successful feedback based on the HARQ-ACK reporting mechanism.

In this embodiment of this disclosure, in FIG. 9, a bus architecture may include any quantity of interconnected buses and bridges, and specifically connects together circuits that are of one or more processors represented by the processor 901 and of a memory represented by the memory 903. The bus architecture may further interconnect various other circuits such as a peripheral device, a voltage regulator, and a power management circuit. These are all well known in the art, and therefore are not further described in this specification. The bus interface provides an interface. The transceiver 902 may be a plurality of components, that is, the transceiver 1302 includes a transmitter and a receiver, and provides a unit for communicating with various other apparatuses on a transmission medium. For different user equipments, the user interface 904 may also be an interface that can be externally or internally connected to a required device. The connected device includes but is not limited to a keypad, a display, a speaker, a microphone, a joystick, and the like. The processor 901 is responsible for bus architecture management and general processing. The memory 903 may store data used when the processor 901 performs an operation.

In addition, the network device 900 includes some functional modules that are not shown. Details are not described herein.

Embodiment 12

Optionally, an embodiment of this disclosure further provides a terminal device, including a memory, a processor, and a computer program stored in the memory and capable of running on the processor. When the computer program is executed by the processor, the processes of the foregoing embodiment of the method for feedback control are implemented, with the same technical effects achieved. To avoid repetition, details are not described herein again.

Optionally, an embodiment of this disclosure further provides a network device, including a memory, a processor, and a computer program stored in the memory and capable of running on the processor. When the computer program is executed by the processor, the processes of the foregoing embodiment of the method for feedback control are implemented, with the same technical effects achieved. To avoid repetition, details are not described herein again.

An embodiment of this disclosure further provides a computer readable storage medium, where a computer program is stored in the computer readable storage medium. When the computer program is executed by a processor, the processes of the method for feedback control in the foregoing embodiments, with the same technical effects achieved. To avoid repetition, details are not described herein again. The computer-readable storage medium includes a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation.

Based on such an understanding, the technical solutions of this disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A method for feedback control, applied to user equipment (UE), wherein the method comprises:
   receiving first downlink control information (DCI) from a network device, wherein the first DCI comprises a first field, and the first field is used to indicate whether hybrid automatic repeat request acknowledgment (HARQ-ACK) information for at least one physical downlink shared channel (PDSCH) group is carried on a first uplink control channel for transmission; wherein the first field occupies M bits, M is a positive integer less than P, and P is a maximum number of PDSCH groups applicable to the UE;
   wherein M is equal to P minus 1.

2. The method according to claim 1, wherein the first DCI is further used to indicate a first PDSCH group, the first PDSCH group is indicated by one first index, each of the at least one PDSCH group is indicated by one second index, and each second index corresponds to one of the M bits; wherein, for each second index:
   in a case that one second index is less than the first index, a position index of a bit corresponding to the one second index is the same as the one second index; or
   in a case that one second index is greater than the first index, a position index of a bit corresponding to the one second index equals the one second index minus 1.

3. The method according to claim 2, wherein the first DCI further comprises a second field, the second field is used to indicate the first PDSCH group, and the second field occupies T bits; and
   T is determined based on P;
   wherein T is obtained by rounding up a floating point number of K, and K is obtained by logarithm base 2 of P;
   or,
   wherein the first PDSCH group is a PDSCH group to which a PDSCH scheduled by the first DCI belongs, and HARQ-ACK information corresponding to the first PDSCH group is carried on a PUCCH resource scheduled by the first DCI, for transmission.

4. The method according to claim 1, wherein after the receiving first DCI from a network device, the method further comprises:
   sending a first uplink control channel to the network device, wherein the first uplink control channel carries at least one piece of first feedback information, and each piece of first feedback information is HARQ-ACK information for one PDSCH group.

5. The method according to claim 4, wherein the method further comprises:
   in a case that it is detected that a preset condition is satisfied, sending a second uplink control channel to the network device, wherein the second uplink control channel carries at least one piece of second feedback information, each piece of second feedback information is HARQ-ACK information for one HARQ process, and HARQ process(es) corresponding to the at least one piece of second feedback information are all HARQ processes configured by the network device for the UE.

6. The method according to claim 5, wherein the preset condition is at least one of the following: the number of PDSCH groups that is indicated by DCI received by the UE is greater than or equal to a first threshold, the number of PDSCH groups that is indicated by the DCI received by the UE is P, the number of bits of fourth feedback information is greater than or equal to a second threshold, or the UE receives target indication information; and the fourth feedback information is HARQ-ACK information for all PDSCH groups that are indicated in the DCI received by the UE, and the target indication information is used to indicate that the UE sends HARQ-ACK information for all HARQ processes that are configured by the network device for the UE.

7. The method according to claim 6, wherein the target indication information is sent to the UE by the network device through common signaling;
   wherein the target indication information is indicated by one bit in the common signaling;
   wherein the common signaling further comprises assistance information; the assistance information is used to indicate a data transmission state of each of all the HARQ processes that are configured by the network device for the UE; and the data transmission state is a scheduled state or an unscheduled state.

8. A method for feedback control, applied to a network device, wherein the method comprises:
   sending first downlink control information (DCI) to user equipment (UE), wherein the first DCI comprises a first field, and the first field is used to indicate whether hybrid automatic repeat request acknowledgment (HARQ-ACK) information for at least one physical downlink shared channel (PDSCH) group is carried on a first uplink control channel for transmission; wherein the first field occupies M bits, M is a positive integer less than P, and P is a maximum number of PDSCH groups applicable to the UE;
   wherein M is equal to P minus 1.

9. The method according to claim 8, wherein the first DCI is further used to indicate a first PDSCH group, the first PDSCH group is indicated by one first index, each of the at least one PDSCH group is indicated by one second index, and each second index corresponds to one of the M bits; wherein, for each second index:
   in a case that one second index is less than the first index, a position index of a bit corresponding to the one second index is the same as the one second index; or
   in a case that one second index is greater than the first index, a position index of a bit corresponding to the one second index equals the one second index minus 1.

10. The method according to claim 9, wherein the first DCI further comprises a second field, the second field is used to indicate the first PDSCH group, and the second field occupies T bits; and T is determined based on P;
wherein T is obtained by rounding up a floating point number of K, and K is obtained by logarithm base 2 of P;

or, wherein the first PDSCH group is a PDSCH group to which a PDSCH scheduled by the first DCI belongs, and HARQ-ACK information corresponding to the first PDSCH group is carried on a PUCCH resource scheduled by the first DCI, for transmission.

11. The method according to claim 8, wherein after the sending first DCI from UE, the method further comprises:

receiving a first uplink control channel from the UE, wherein the first uplink control channel carries at least one piece of first feedback information, and each piece of first feedback information is HARQ-ACK information for one PDSCH group.

12. The method according to claim 9, wherein the method further comprises:

receiving a second uplink control channel from the UE, wherein the second uplink control channel carries at least one piece of second feedback information, each piece of second feedback information is HARQ-ACK information for one HARQ process, and HARQ process(es) corresponding to the at least one piece of second feedback information are all HARQ processes configured by the network device for the UE.

13. The method according to claim 12, wherein before the receiving a second uplink control channel from the UE, the method further comprises:

sending target indication information to the UE, wherein the target indication information is used to indicate that the UE sends HARQ-ACK information for all HARQ processes that are configured by the network device for the UE.

14. The method according to claim 13, wherein the target indication information is sent through common signaling;

wherein the target indication information is indicated by one bit in the common signaling;
wherein the common signaling further comprises assistance information; the assistance information is used to indicate a data transmission state of each of all the HARQ processes that are configured by the network device for the UE; and the data transmission state is a scheduled state or an unscheduled state.

15. User equipment, comprising a processor, a memory, and a computer program stored in the memory and capable of running on the processor, wherein the computer program is executed by the processor to implement:

receiving first downlink control information (DCI) from a network device, wherein the first DCI comprises a first field, and the first field is used to indicate whether hybrid automatic repeat request acknowledgment (HARQ-ACK) information for at least one physical downlink shared channel (PDSCH) group is carried on a first uplink control channel for transmission; wherein the first field occupies M bits, M is a positive integer less than P, and P is a maximum number of PDSCH groups applicable to the UE;

wherein M is equal to P minus 1.

16. The user equipment according to claim 15, wherein the first DCI is further used to indicate a first PDSCH group, the first PDSCH group is indicated by one first index, each of the at least one PDSCH group is indicated by one second index, and each second index corresponds to one of the M bits; wherein, for each second index:

in a case that one second index is less than the first index, a position index of a bit corresponding to the one second index is the same as the one second index; or
in a case that one second index is greater than the first index, a position index of a bit corresponding to the one second index equals the one second index minus 1.

17. The user equipment according to claim 16, wherein the first DCI further comprises a second field, the second field is used to indicate the first PDSCH group, and the second field occupies T bits; and T is determined based on P;
wherein T is obtained by rounding up a floating point number of K, and K is obtained by logarithm base 2 of P;

or, wherein the first PDSCH group is a PDSCH group to which a PDSCH scheduled by the first DCI belongs, and HARQ-ACK information corresponding to the first PDSCH group is carried on a PUCCH resource scheduled by the first DCI, for transmission.

18. The user equipment according to claim 15, wherein after the receiving first DCI from a network device, wherein the computer program is further executed by the processor to implement:

sending a first uplink control channel to the network device, wherein the first uplink control channel carries at least one piece of first feedback information, and each piece of first feedback information is HARQ-ACK information for one PDSCH group.

19. The user equipment according to claim 18, wherein the computer program is further executed by the processor to implement:

in a case that it is detected that a preset condition is satisfied, sending a second uplink control channel to the network device, wherein the second uplink control channel carries at least one piece of second feedback information, each piece of second feedback information is HARQ-ACK information for one HARQ process, and HARQ process(es) corresponding to the at least one piece of second feedback information are all HARQ processes configured by the network device for the UE.

20. The user equipment according to claim 19, wherein the preset condition is at least one of the following: the number of PDSCH groups that is indicated by DCI received by the UE is greater than or equal to a first threshold, the number of PDSCH groups that is indicated by the DCI received by the UE is P, the number of bits of fourth feedback information is greater than or equal to a second threshold, or the UE receives target indication information; and the fourth feedback information is HARQ-ACK information for all PDSCH groups that are indicated in the DCI received by the UE, and the target indication information is used to indicate that the UE sends HARQ-ACK information for all HARQ processes that are configured by the network device for the UE.

* * * * *